US 7,856,055 B2

(12) United States Patent
Zhou et al.

(10) Patent No.: US 7,856,055 B2
(45) Date of Patent: Dec. 21, 2010

(54) SYSTEMS AND METHODS FOR DIGITALLY RE-MASTERING OR OTHERWISE MODIFYING MOTION PICTURES OR OTHER IMAGE SEQUENCES DATA

(75) Inventors: Samuel Zhou, North York (CA); Ping Ye, Mississauga (CA); Paul Judkins, Toronto (CA)

(73) Assignee: Imax Corporation (CA)

( * ) Notice: Subject to any disclaimer, the term of this patent is extended or adjusted under 35 U.S.C. 154(b) by 1384 days.

(21) Appl. No.: 10/474,780

(22) PCT Filed: Mar. 13, 2003

(86) PCT No.: PCT/IB03/00919

§ 371 (c)(1),
(2), (4) Date: Oct. 14, 2003

(87) PCT Pub. No.: WO03/077549

PCT Pub. Date: Sep. 18, 2003

(65) Prior Publication Data

US 2004/0130680 A1   Jul. 8, 2004

Related U.S. Application Data

(60) Provisional application No. 60/365,021, filed on Mar. 13, 2002.

(51) Int. Cl.
*H04N 7/12* (2006.01)
*H04N 11/02* (2006.01)
(52) U.S. Cl. ............................. 375/240.12; 375/240.26
(58) Field of Classification Search ..................
375/240.01–240.07, 240.12–240.16, 240.26
See application file for complete search history.

(56) References Cited

U.S. PATENT DOCUMENTS 4,925,294 A   5/1990   Geshwind et al.

(Continued)

FOREIGN PATENT DOCUMENTS

CA   2279797   2/2001

(Continued)

OTHER PUBLICATIONS

Ernst, E., "Motion Compensated Interpolation for Advanced Standards Conversion and Noise Reduction," *Signal Processing of HDTV, III*, pp. 319-328 (Sep. 4, 1991).

(Continued)

*Primary Examiner*—David Czekaj
(74) *Attorney, Agent, or Firm*—Kilpatrick Stockton LLP

(57) ABSTRACT

A process and methods of digital enhancement of motion pictures and other moving image sequences for the purpose of being exhibited in an alternative display format including a large format cinema are disclosed. The invention efficiently enhances image resolution and quality through a temporal filtering process and achieves high performance using automated or interactive statistical quality evaluation methods. A system specially designed for efficient temporal computing with a parallel and distributed computing configuration equipped with a variety of optimization schemes is also disclosed. The performance of the process and the system is optimized through an intelligent controller and is scalable to support any throughput requirements demanded for concurrent motion picture releases in the original format as well as in any alternative format.

47 Claims, 13 Drawing Sheets

U.S. PATENT DOCUMENTS

| | | | |
|---|---|---|---|
| 5,259,040 A | 11/1993 | Hanna | |
| 5,325,449 A | 6/1994 | Burt et al. | |
| 5,379,369 A | 1/1995 | Komma et al. | |
| 5,488,674 A | 1/1996 | Burt et al. | |
| 5,510,832 A | 4/1996 | Garcia | |
| 5,589,852 A | 12/1996 | Thompson et al. | |
| 5,600,731 A | 2/1997 | Sezan et al. | |
| 5,629,988 A | 5/1997 | Burt et al. | |
| 5,649,032 A | 7/1997 | Burt et al. | |
| 5,682,437 A | 10/1997 | Okino et al. | |
| 5,694,491 A | 12/1997 | Brill et al. | |
| 5,719,966 A | 2/1998 | Brill et al. | |
| 5,738,430 A | 4/1998 | Brill | |
| 5,739,844 A | 4/1998 | Kuwano et al. | |
| 5,748,199 A | 5/1998 | Palm | |
| 5,790,686 A * | 8/1998 | Koc et al. | 382/107 |
| 5,835,627 A * | 11/1998 | Higgins et al. | 382/167 |
| 5,909,516 A | 6/1999 | Lubin | |
| 5,946,041 A | 8/1999 | Morita | |
| 5,963,664 A | 10/1999 | Kumar et al. | |
| 5,974,159 A | 10/1999 | Lubin et al. | |
| 5,978,029 A * | 11/1999 | Boice et al. | 375/240.14 |
| 5,999,220 A | 12/1999 | Washino | |
| 6,031,564 A | 2/2000 | Ma et al. | |
| 6,061,477 A | 5/2000 | Lohmeyer et al. | |
| 6,067,125 A * | 5/2000 | May | 348/607 |
| 6,072,907 A | 6/2000 | Taylor et al. | |
| 6,075,884 A | 6/2000 | Lubin et al. | |
| 6,108,005 A | 8/2000 | Starks et al. | |
| 6,130,660 A | 10/2000 | Imsand | |
| 6,130,717 A * | 10/2000 | Arai et al. | 348/360 |
| 6,137,904 A | 10/2000 | Lubin et al. | |
| 6,141,459 A | 10/2000 | Gendel | |
| 6,191,809 B1 | 2/2001 | Hori et al. | |
| 6,208,348 B1 | 3/2001 | Kaye | |
| 6,215,516 B1 | 4/2001 | Ma et al. | |
| 6,219,462 B1 | 4/2001 | Anandan et al. | |
| 6,266,092 B1 | 7/2001 | Wang et al. | |
| 6,269,175 B1 | 7/2001 | Hanna et al. | |
| 6,298,090 B1 * | 10/2001 | Challapali et al. | 375/240.29 |
| 6,351,545 B1 | 2/2002 | Edelson et al. | |
| 6,477,267 B1 | 11/2002 | Richards | |
| 6,487,304 B1 | 11/2002 | Szeliski | |
| 6,496,598 B1 | 12/2002 | Harman | |
| 6,515,659 B1 | 2/2003 | Kaye et al. | |
| 6,522,787 B1 | 2/2003 | Kumar et al. | |
| 6,560,281 B1 * | 5/2003 | Black et al. | 375/240 |
| 6,573,912 B1 | 6/2003 | Suzuki et al. | |
| 6,590,573 B1 | 7/2003 | Geshwind | |
| 6,625,333 B1 | 9/2003 | Wang et al. | |
| 6,686,926 B1 | 2/2004 | Kaye | |
| 6,728,317 B1 * | 4/2004 | Demos | 375/240.21 |
| 6,806,898 B1 | 10/2004 | Toyama et al. | |
| 6,856,314 B2 | 2/2005 | Ng | |
| 6,968,006 B1 * | 11/2005 | Puri et al. | 375/240.08 |
| 6,992,700 B1 * | 1/2006 | Sato et al. | 348/208.2 |
| 7,006,157 B2 | 2/2006 | Sohn | |
| 7,079,697 B2 * | 7/2006 | Zhou | 382/250 |
| 7,227,125 B2 | 6/2007 | Sannomiya et al. | |
| 7,227,896 B2 * | 6/2007 | Sun | 375/240.16 |
| 7,260,274 B2 | 8/2007 | Sawhney et al. | |
| 2001/0031003 A1 | 10/2001 | Sawhney et al. | |
| 2002/0035432 A1 * | 3/2002 | Kubica et al. | 702/5 |
| 2002/0149696 A1 | 10/2002 | Cok et al. | |
| 2003/0016750 A1 | 1/2003 | Cok | |
| 2004/0130680 A1 | 7/2004 | Zhou et al. | |
| 2004/0202445 A1 | 10/2004 | DiFrancesco | |
| 2005/0226529 A1 | 10/2005 | Kondo | |
| 2005/0254011 A1 | 11/2005 | Weisgerber | |

FOREIGN PATENT DOCUMENTS

| | | |
|---|---|---|
| EP | 0665697 | 5/2000 |
| EP | 0735512 | 6/2002 |
| EP | 2033164 | 3/2009 |
| JP | 6102484 | 4/1994 |
| WO | WO 93/07585 | 4/1993 |
| WO | WO 93/23823 | 11/1993 |
| WO | WO 94/10675 | 5/1994 |
| WO | WO 96/15508 | 5/1996 |
| WO | WO 97/01135 | 1/1997 |
| WO | WO 97/24000 | 7/1997 |
| WO | WO 97/37323 | 10/1997 |
| WO | WO 98/02844 | 1/1998 |
| WO | WO 98/21690 | 5/1998 |
| WO | WO 98/52356 A1 | 11/1998 |
| WO | WO 99/12127 | 3/1999 |
| WO | WO 00/13423 | 3/2000 |
| WO | WO 01/28238 A2 | 4/2001 |
| WO | WO 02/03687 | 1/2002 |
| WO | WO 02/12143 | 2/2002 |
| WO | WO 02/45003 | 6/2002 |
| WO | WO 03/077549 | 9/2003 |
| WO | WO 2007/085950 | 8/2007 |
| WO | WO 2007/148219 | 12/2007 |

OTHER PUBLICATIONS

Glenn Kennel, "Digital Film Scanning and Recording: The Technology and Practice," *SMPTE Journal*, pp. 174-181(1994).

Christoph Stiller and Janusz Konrad, "Estimating Motion in Image Sequences," *IEEE Signal Processing Magazine*, pp. 70-91 (1999).

Supplementary European Search Report for Application No. 01989802.2, dated Mar. 23, 2009.

Kumar, et al., "3D Manipulation of Motion Imagery," Image Processing, 2000. Proceedings. 2000 International Conference on Sep. 10-13, 2000, Piscataway, NJ, USA, IEEE, pp. 17-20, Sarnoff Corporation.

Sawhney, "Hybrid Stereo Camera: An IBR Approach for Synthesis of Very High Resolution Stereoscopic Image Sequences," Computer Graphics. Siggraph 2001. Conference Proceedings, Los Angeles, CA, Aug. 12-17, 2001, pp. 451-460.

Baker, et al., "A Layered Approach to Stereo Reconstruction," Proceedings of Computer Vision and Pattern Recognition Conference, Jun. 1998, pp. 434-441.

Baroncini, et al. "The Image Resolution of 35mm Cinema Film in Theatrical Presentation," SMPTE Imaging Journal, vol. 113, No. 2&3, Feb./Mar. 2004, pp. 60-66.

Borcsok, et al. "Generation of 3D Image Sequences from Mixed 2D and 3D Image Sources," SCI 2001, The 5$^{th}$ Multi-Conference on Systematics, Cybernetics and Informatics, Jul. 22-25, Florida, USA, 2001.

Burt, et al., "The Laplacian Pyramid as a Compact Image Code," IEEE Transactions on Communications, vol. 31 (4), pp. 532-540 (1983).

Debevec, et al., "Modeling and Rendering Architecture from Photographs: A Hybrid Geometry- and Image- based Approach," *Proceedings of SIGGRAPH '96*, New Orleans, Louisiana, Aug. 4-9, 1996, pp. 11-20.

Dunkley, "A New 3-D from 2-D Virtual Display Process," Proceedings of SPIE, vol. 1915, Stereo Displays and Applications IV, San Jose, Feb. 1, 1993, San Jose, CA, pp. 132-140.

Feldman, et al., "Interactive 2D to 3D stereoscopic image synthesis," *Proceedings of SPIE* vol. 5664 Stereoscopic Displays and Virtual Reality Systems XII, San Jose, CA, Jan. 17-19, 2005.

Garcia, "Approaches to Stereoscopic Video Based on Spatio-Temporal Interpolation," Proceedings of SPIE, vol. 2653, Stereoscopic Displays and Virtual Reality Systems III, Jan.30-Feb. 1, 1996, San Jose, CA, pp. 85-95.

Hanna, et al., "Combining stereo and motion analysis for direct estimation of scene structure". In Proceedings IEEE International Conference on Computer Vision, Berlin, Germany, pp. 357-365, May 11-14, 1993.

Hanna, "Direct multi-resolution estimation of ego-motion and structure from motion". In Proceedings IEEE Workshop on Visual Motion, Nassau Inn, Princeton, New Jersey, Oct. 7-9, 1991, pp. 156-162.

Harman, "An Architecture for Digital 3D Broadcasting," Proceedings of SPIE, vol. 3639, Stereoscopic Displays and Virtual Reality Systems VI, Jan. 25-28, 1999, San Jose, CA, pp. 254-259.

Harman, "Home Based 3D Entertainment—An Overview," Proceedings of IEEE International Conference on Image Processing, Sep. 10-13, 2000, Vancouver, Cananda, pp. 1-4.

Harman, et al., "Rapid 2D-to-3D Conversion," Proceedings of SPIE, vol. 4660, Stereoscopic Displays and Virtual Reality Systems IX, Jan. 21-24, 2002, San Jose, CA, pp. 78-86.

Healey, et al., "Global Color Constancy: Recognition of objects by use of illumination invariant properties of color distributions," Journal of the Optical Society of America A, 11(11):3003-3010, Nov. 1994.

Hoberman, "Depth Painting: the Interactive Transformation of Existing Images into Steroscopic 3D," Proceedings of SPIE, vol. 2177, Stereoscopic Displays and Virtual Reality Systems, Feb. 8-10, 1994, San Jose, CA, pp. 78-85.

Hodges, "Tutorial: Time-Multiplexed Stereoscopic Computer Graphics," *IEEE Computer Graphics and Applications*, Mar. 1992, pp. 20-20.

Horry, et al. "Tour Into the Picture: Using a Spidery Mesh Interface to Make Animation from a Single Image," Proceedings of Siggraph '97, Aug. 3-8, 1997, LA, CA, pp. 225-232.

Kennel, "Digital Film Scanning and Recording: The Technology and Practice," SMPTE Journal, pp. 174-181 (1994).

Kim, et al., "Stereoscopic Conversion of Monoscopic Video by the Transformation of Vertical-to-horizontal Disparity," Proceedings of SPIE, vol. 3295, Stereo Displays and Virtual Reality Systems V, San Jose, CA, Jan. 26-29, 1998, pp. 65-75.

Kim, et al., "Synthesis of a High-resolution 3D-stereoscopic Image Pair from a High Resolution Monoscopic Image and a Low-resolution Depth Map," Proceedings of SPIE, vol. 3295, Stereo Displays and Virtual Reality Systems V, San Jose, CA, Jan. 26-29, 1998, pp. 76-86.

Kumar, et al., "Direct multi-resolution estimation of ego—motion and structure from motion". In Proceedings IEEE Workshop on Visual Motion, Nassau Inn, Princeton, New Jersey, Oct. 7-9, 1991, pp. 156-162.

Kumar, et al., "Representation of scenes from collection of images," In Proc. IEEE Wkshp. on Representation of Visual Scenes, Cambridge, MA 1995.

Levinson, et al., "Development of an Autostereoscopic Monitor and 2D to 3D Conversion for Medical and Surgical Uses; Requirements, Clinical Trials and Degree of Acceptance," Proceedings of SPIE, vol. 3639, Stereoscopic Displays and Virtual Reality Systems VI, Jan. 25-28, 1999, San Jose, CA, pp. 36-43.

Matsumoto, et al., "Conversion System of Monocular Image Sequence to Stereo using Motion Parallax," Proceedings of SPIE, vol. 3012, Stereo Displays and Virtual Reality Systems IV, San Jose, Feb. 11-14, 1997, pp. 108-115.

McAllister, "Stereo Pairs from Linear Morphing," Proceedings of SPIE, vol. 3295, Stereoscopic Displays and Virtual Reality Systems V, Jan. 26-29, 1998, San Jose, CA, pp. 46-52.

Morton, et al., "Assessing the Quality of Motion Picture Systems from Scene-to-Digital Data," SMPTE Journal, vol. 111, No. 2, Feb./Mar. 2002, pp. 85-96.

Murata, et al., "A Real-Time 2-D to 3-D Image Conversion Technique Using Computed Image Depth," SID Symposium Digest of Technical Papers, May 1998—vol. 29, Issue 1, pp. 919-923.

Okino, et al., "New Television with 2D/3D image conversion technolgies," Proceedings of SPIE, vol. 2653, Stereoscopic Displays and Virtual Reality Systems III, Jan. 30-Feb. 1, 1996, San Jose, CA, pp. 96-105.

Panabaker, et al. "IMAX HD—A High Definition Motion Picture System," 135th SMPTE Technical Conference, Oct. 29-Nov. 2, 1993, Los Angeles, CA.

R. Kumar, et al., "Direct recovery of shape from multiple views: A parallax based approach". In International Conference on Pattern Recognition, pp. 685-688 (1994).

Rotem, et al., "Automatic video-to-stereoscopic-video conversion," *Proceedings of SPIE* vol. 5664 Stereoscopic Displays and Virtual Reality Systems XII, San Jose, CA, Jan. 17-19, 2005.

Sawhney, "3D Geometry from Planar Parallax," In Proc. IEEE Computer Vision and Pattern Recognition Conference, Seattle, WA, Jun. 21-23, 1994.

Scharstein, "stereo vision for view synthesis," *IEEE Computer Society Conference on Computer Vision and Pattern Recognition (CVPR'96)*, pp. 852-858, San Francisco, CA, Jun. 1996.

Shao, et al., "Automatic 2D to 3D Footage Conversion for 3D Glasses-free Display Systems," ICCV 2003 demonstrations, Oct. 13-16, 2003.

Slater, et al., "The Illumination-Invariant Recognition of 3-D Objects Using Local Color Invariants," IEEE Transactions on Pattern Analysis and Machine Intelligence, 18(2):206-210, Feb. 1996.

Stiller, et al., "Estimating Motion in Image Sequences," IEEE Signal Processing Magazine, Jul. 1999, pp. 70-91.

Szeliski, "Scene Reconstruction from Multiple Cameras," Proceedings of IEEE International Conference on Image Processing, Sep. 10-13, 2000, Vancouver, Canada, pp. 13-16.

Tam, et al., "Stereoscopic Image Rendering Based on Depth Maps Created from Blur and Edge Information," *Proceedings of SPIE* vol. 5664 Stereoscopic Displays and Virtual Reality Systems XII, San Jose, CA, Jan. 17-19, 2005.

Valencia, et al., "Synthesizing stereo 3D views from focus cues in monoscopic 2D images," Proceedings of SPIE, vol. 5006, Stereoscopic Displays and Virtual Reality Systems X, Jan. 21-23, 2003, Santa Clara, CA.

International Preliminary Examination report for PCT/US2001/44995, dated Aug. 4, 2002.

International Search Report for PCT/US2001/44995, dated Apr. 4, 2002.

International Preliminary Examination Report for PCT/IB2003/00919, dated Mar. 24, 2004.

International Search Report for PCT/IB2003/00919, dated Dec. 8, 2003.

International Preliminary Examination report for PCT/IB2007/001726, dated Jan. 6, 2009.

International Search Report for PCT/IB2007/001726, dated Feb. 12, 2008.

International Preliminary Examination report for PCT/IB2007/000188, Jul. 29, 2008.

International Search Report for PCT/IB2007/000188, dated Jun. 26, 2007.

\* cited by examiner

SYSTEMS AND METHODS FOR DIGITALLY RE-MASTERING OR OTHERWISE MODIFYING MOTION PICTURES OR OTHER IMAGE SEQUENCES DATA

RELATED APPLICATIONS

This application is the U.S. national phase of International Application No. PCT/IB03/00919 filed with the International Bureau on Mar. 13, 2003, which application claims the benefit of U.S. Provisional Application No. 60/365,021 filed Mar. 13, 2002 entitled, "Systems and Methods for Digitally Re-Mastering or Otherwise Modifying Motion Pictures or Other Image Sequences Data for Alternative Format Including Large Format Projection or Other Purposes", the contents of which are incorporated by reference herein.

FIELD OF THE INVENTION

The present invention is broadly directed (but not limited) to the field of digitally re-mastering or otherwise modifying motion picture contents and, more specifically, to a system and a method that efficiently computes image data from an entire motion picture in a parallel and pipeline fashion for the purpose of concurrent release with the original format, and to a method that enhances images by improving image resolution and quality for exhibition, typically in an alternative format including large format projection environment. The present invention is also applicable to the enhancement of a broad range of image sequences originated from film, video, optical devices, electronic sensors, and so on. It additionally may be employed to improve quality of images for display in their original format.

BACKGROUND OF THE INVENTION

A motion picture produced in a 35 mm film format is intended to be exhibited in a conventional format cinema or in other smaller formats like home video and broadcast television. The display resolution required to maintain adequate display quality can be calculated based on the screen size, the theatre geometry, audience seating positions as well as the minimum visual acuity that needs to be maintained in order to deliver the required image quality. In a conventional cinema, a display resolution of around 2000 pixels across the width of the screen is considered adequate for delivery of satisfactory image quality. This resolution requirement is largely supported by the 35 mm film formats as well as by existing film production process chain from original photography, post-production, to film laboratory process. A similar display resolution requirement is also recommended for digital cinemas designed to replace conventional film-based cinemas.

In a large format cinematic venue, audiences expect a significantly superior visual experience to that which they perceive in a conventional cinema. Audiences in a large format cinema enjoys a field of view much larger than that from a conventional cinema. To maintain a superior visual experience in a large format cinema, the film production chain must deliver a spatial image resolution much higher than that for a conventional cinema. The current 15/70 film format production process chain adequately supports this higher spatial resolution requirement. However, when a motion picture originated for the 35 mm film format is to be exhibited in a large format cinema venue, the existing production system and process cannot deliver sufficient image quality. The present invention defines a method of digitally re-mastering a 35 mm motion picture with enhanced image resolution and quality as demanded by the large format cinematic experience.

The digital re-mastering process of the present invention is primarily (but not exclusively) used for the enhancement of image resolution of a motion image sequence originating with live action film photography. This process can be applied to the enhancement of computer generated animation or cell animation images that have been transferred to film. The digital re-mastering process can also be used to enhance the resolution and the quality of moving images captured using an optical imaging device or an electronic sensor device.

One aspect of the digital re-mastering concept of the present invention is that spatial resolution of each image frame in a live action motion picture sequence can be enhanced through temporal image processing. This is very different from the concept of film restoration in which "cleaning up" noise and "removing" artifacts are primary goals. There were many successful film restoration projects in the past two decades, and typical examples are Disney's *Snow White and Seven Dwarves* re-release and subsequent George Lucas' *Star Wars* trilogy re-releases. Most film restoration methods are designed to compensate for the loss of image quality caused by the deterioration of film conditions and to restore the characteristics of images close to the original form. Since the targeted re-release platform for a film restoration project is usually the same conventional cinema that the film was originally intended to be exhibited, or even smaller exhibition formats like home video and television, enhancing the spatial resolution of original imagery is not a major concern for film restoration.

The digital re-mastering process of the present invention should also be distinguished from existing methods for re-mastering an animated motion picture for large format releases, such as Disney's *Fantasia* 2000 and *Beauty and Beast* large format release production. In those efforts, image data was originally created in a digital form and was not corrupted by a film transfer process. As a result, the spatial resolution of image frames cannot be further enhanced through image processing methods unless those images are re-rendered in more detail. The method used in *Fantasia* 2000 and *Beauty and Beast* re-releases cannot enhance the image resolution of live action film photography.

The most straightforward method of displaying a 35 mm film originated motion picture in a large format cinema is to use a projection lens with a larger magnification to fill the entire screen. This method cannot deliver sufficient visual quality due to the fact that images on a 35 mm release print do not have sufficient spatial resolution. A better method is to digitally enlarge each frame of the motion picture using digital spatial interpolation methods and record the enlarged image data onto a large format film, like the 15/70 film format, for projection. The existing spatial interpolation methods do not improve spatial resolution and often soften images. Certain spatial high-pass filtering methods can be used to improve perceived image sharpness, but those methods also emphasize the noise in the images, like film grain. To reduce image noise, certain low-pass spatial filters can be applied, but those filters inevitably remove image details. Therefore, conventional spatial processing methods cannot satisfy conflicting demands for noise reduction and maintaining image sharpness.

SUMMARY OF THE INVENTION

The image re-mastering method of the present invention provides a solution to achieve both resolution enhancement and noise reduction. This method states that image spatial resolution can be enhanced through temporal image processing. For this method to be applied in the most effective way, the process requires that all image details on its original form be preserved. For images originated on film, the basic elements are film grains. It is well known, as stated by the Sampling Theorem, that all information can be preserved if the spatial sampling grid satisfies the Nyquist sampling frequency, which is twice that of the spatial frequency limit of the image content. When scanning a camera negative film, this is equivalent to using a pixel pitch of no larger than 6 μm, in order to capture image details down to film grain level. For an image frame on a 35 mm film photographed with Academy aperture of 0.825"×0.602", a scanning resolution of at least 3500×2550 pixels is required.

Spatial resolution enhancement is more effective when each image frame is first digitally enlarged using spatial interpolation. Spatial interpolation does not improve spatial resolution, but it expands the image frequency spectrum in the frequency domain so that extra room is available for the additional high-frequency details to be added to the images. This resolution enhancement concept is shown in FIG. 1. The additional image details can be recovered through a temporal filtering process. In a motion sequence, an object in a scene is captured on a sequence of frames, and each frame contains a similar but not identical version of the object. It is possible that certain image details about the object that are not explicit on the current frame may be captured on its neighboring frames. By collecting all information about the object from neighboring frames to improve the current frame, the resulting object on the current frame may exhibit improved details that do not exit in its original form. This concept can be realized through a temporal filtering method in which information from a number of frames is analyzed and combined so that additional image details may be recovered for every frame in an motion sequence. A variation of the temporal filtering method can also be used to reduce temporally uncorrelated noise, like perceived film graininess in an image sequence. A new method for improving image sharpness through the enhancement of MTF measurement is also described.

The temporal processing methods require computationally expensive motion estimation algorithms. One of the challenges is to develop a computing system that implements the present invention in a highly efficient way so that re-mastering a complete motion picture can be achieved in a relatively short period of time. The present invention describes a parallel and distributed computing system with an intelligent central control that manages the image render process with maximum efficiency. The intelligent central control automates the image data enhancement process using various types of optimization schemes. The computing system has a unique architecture that is scalable to any throughput requirement.

Another challenge of the implementation is to define a process that provides functionality to meet a wide range of requirements from a high-quality motion picture re-mastering production. In the present invention, an entire process of re-mastering operations is described that includes various stages and process modules. The core part of the process can be implemented in an automated mode, but it also allows maximum flexibility for human user input and interaction. A set of original algorithms for the estimation of optimal parameters and for automated quality evaluation based on statistical analysis are described in the present invention, and those algorithms are managed by the intelligent central control to deliver maximum quality results.

The process and system described in the present invention is designed to meet the most rigorous production demands, including a concurrent release of a re-mastered format of a new motion picture with its original release. This application requires the re-mastering process and system to be able to accurately and reliably track the status of every operation in the pipeline as well as the status of data flow of every piece of image data. The system configuration described in this invention allows the intelligent central control to track the status of every device throughout the entire process, including facilities remotely located. The intelligent central control also provides up-to-date status reports and answers user specified queries. Those features have proved to be extremely important for meeting a rigorous production schedule for a motion picture re-mastering project.

BRIEF DESCRIPTIONS OF THE DRAWINGS

The teachings of the present invention can be readily understood by considering the following detailed descriptions in conjunction with the accompanying drawings, in which.

Figure 6:
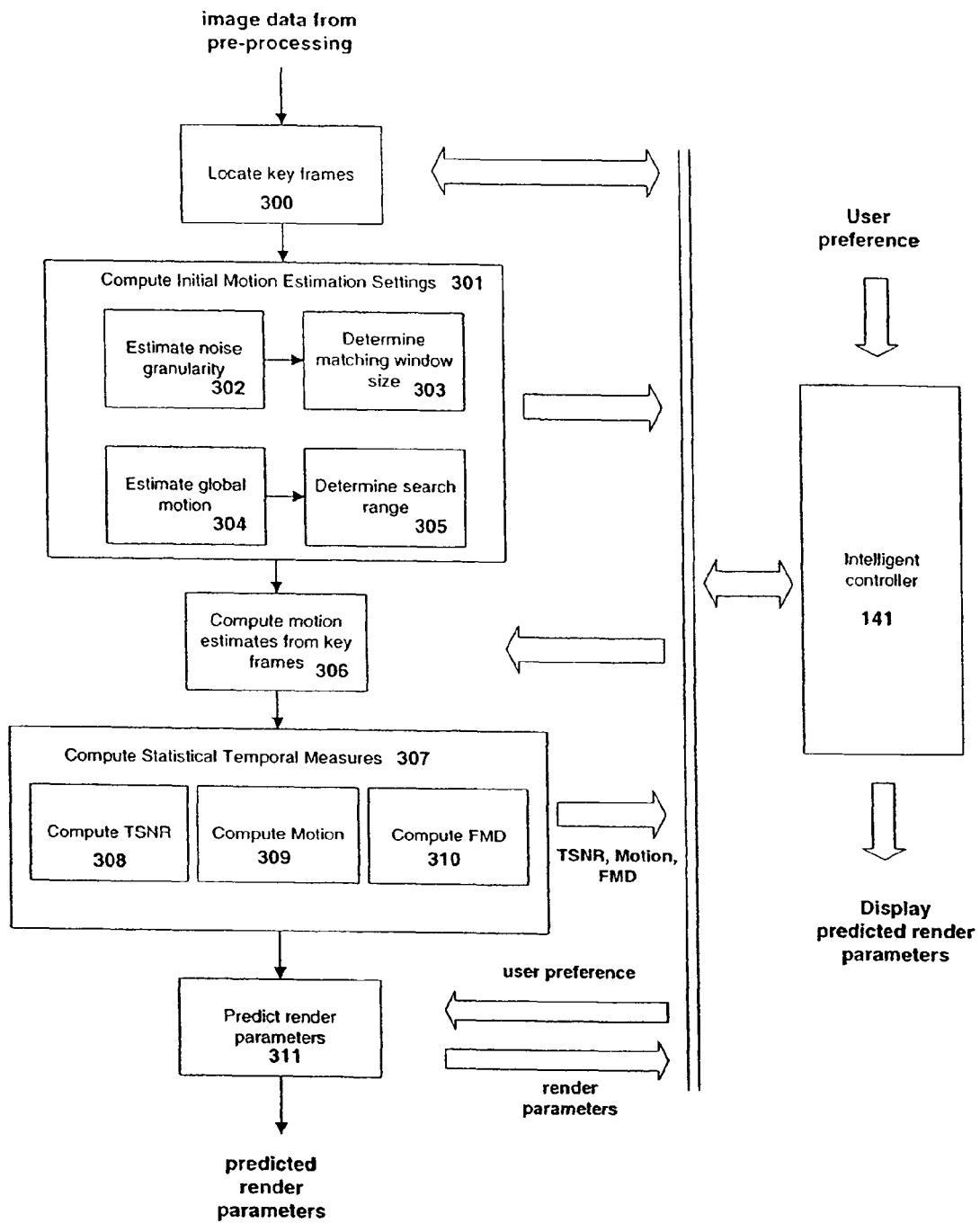
Figure 7:
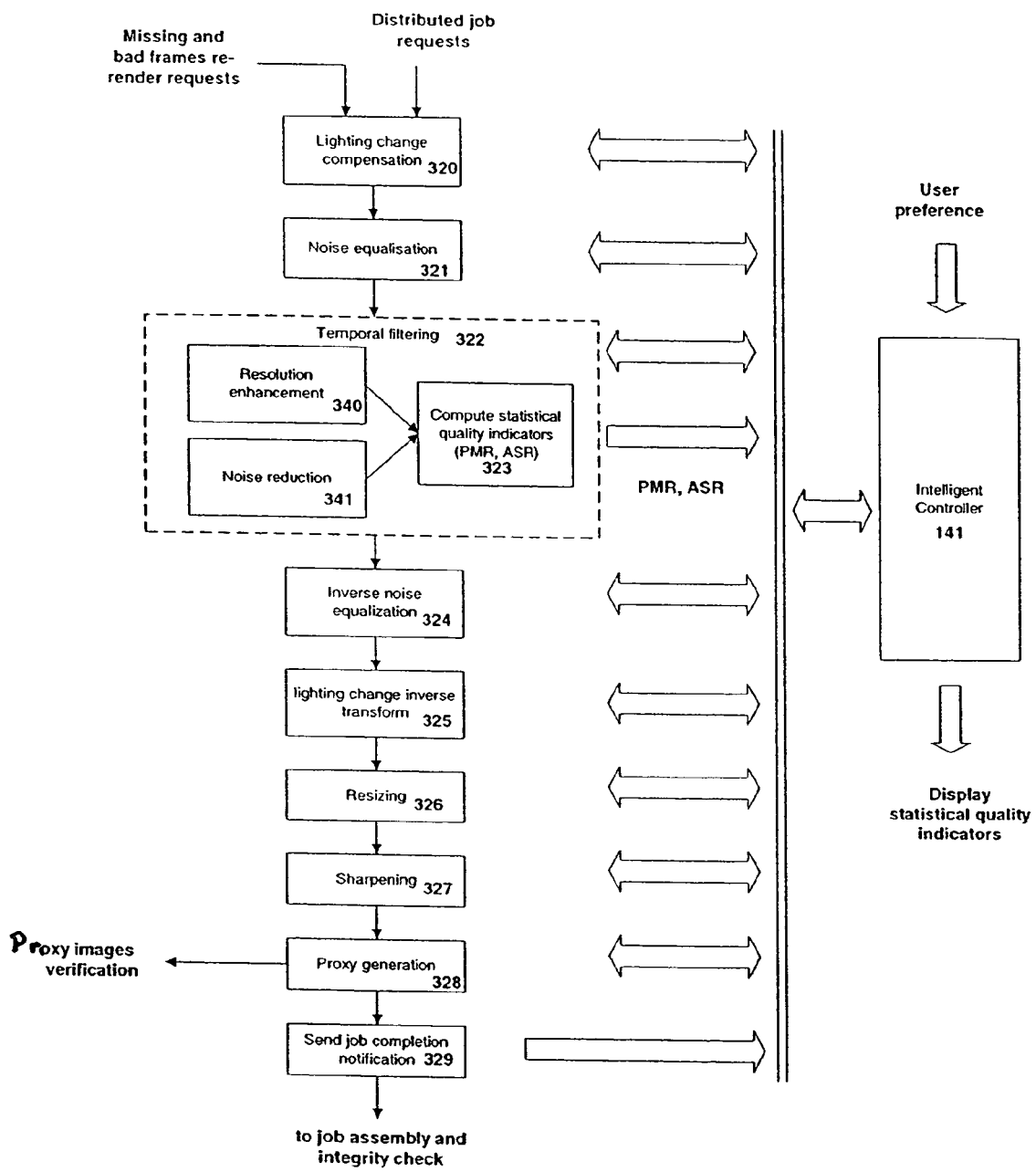
Figure 8:
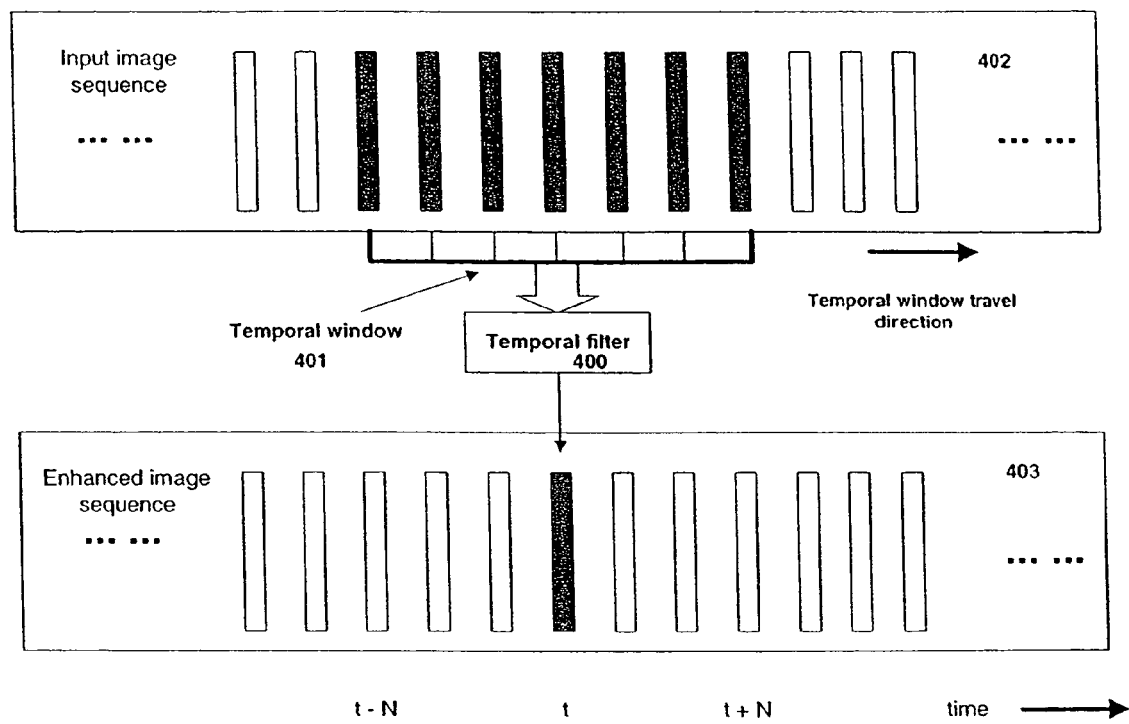
Figure 9:
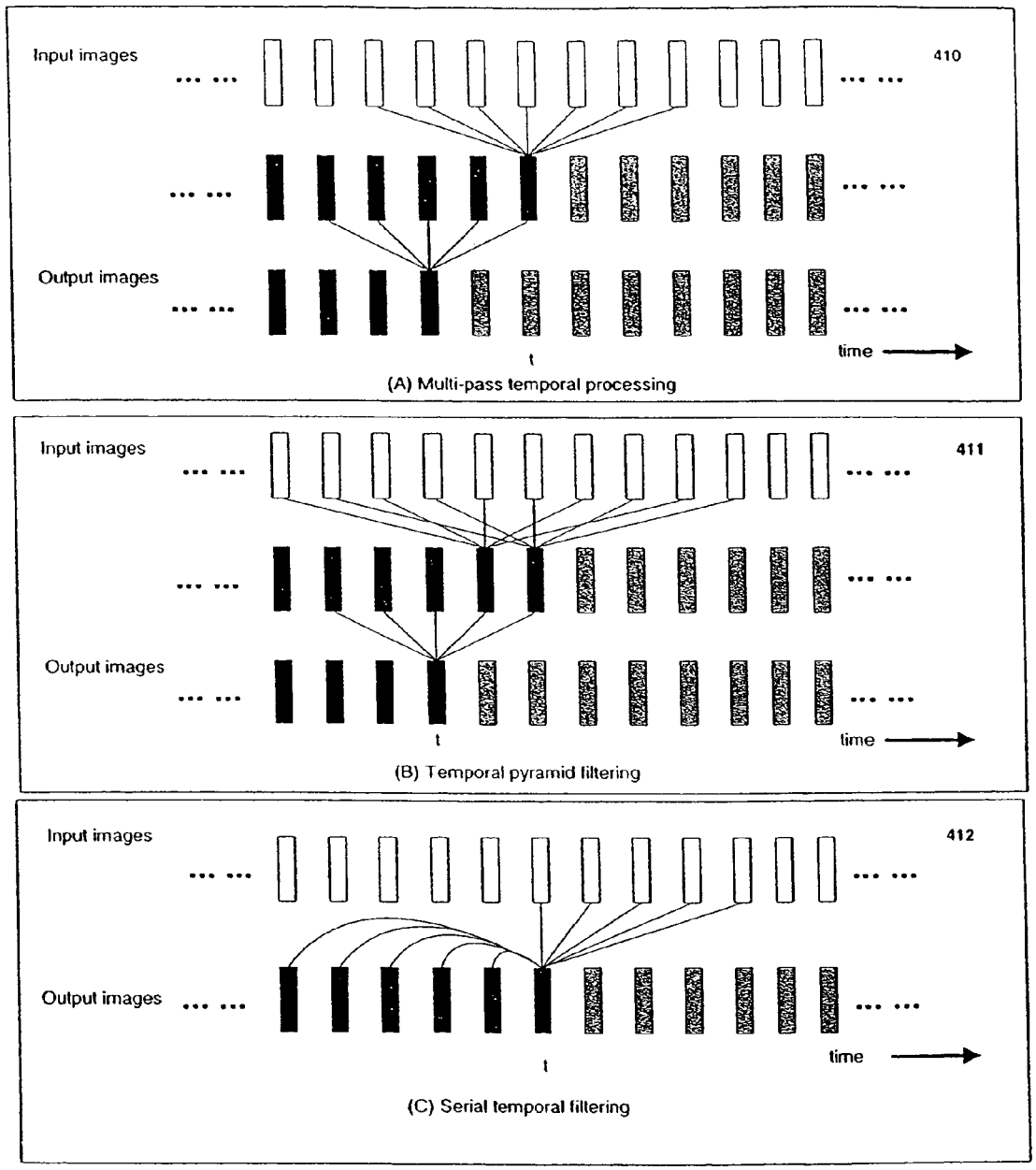
Figure 10:
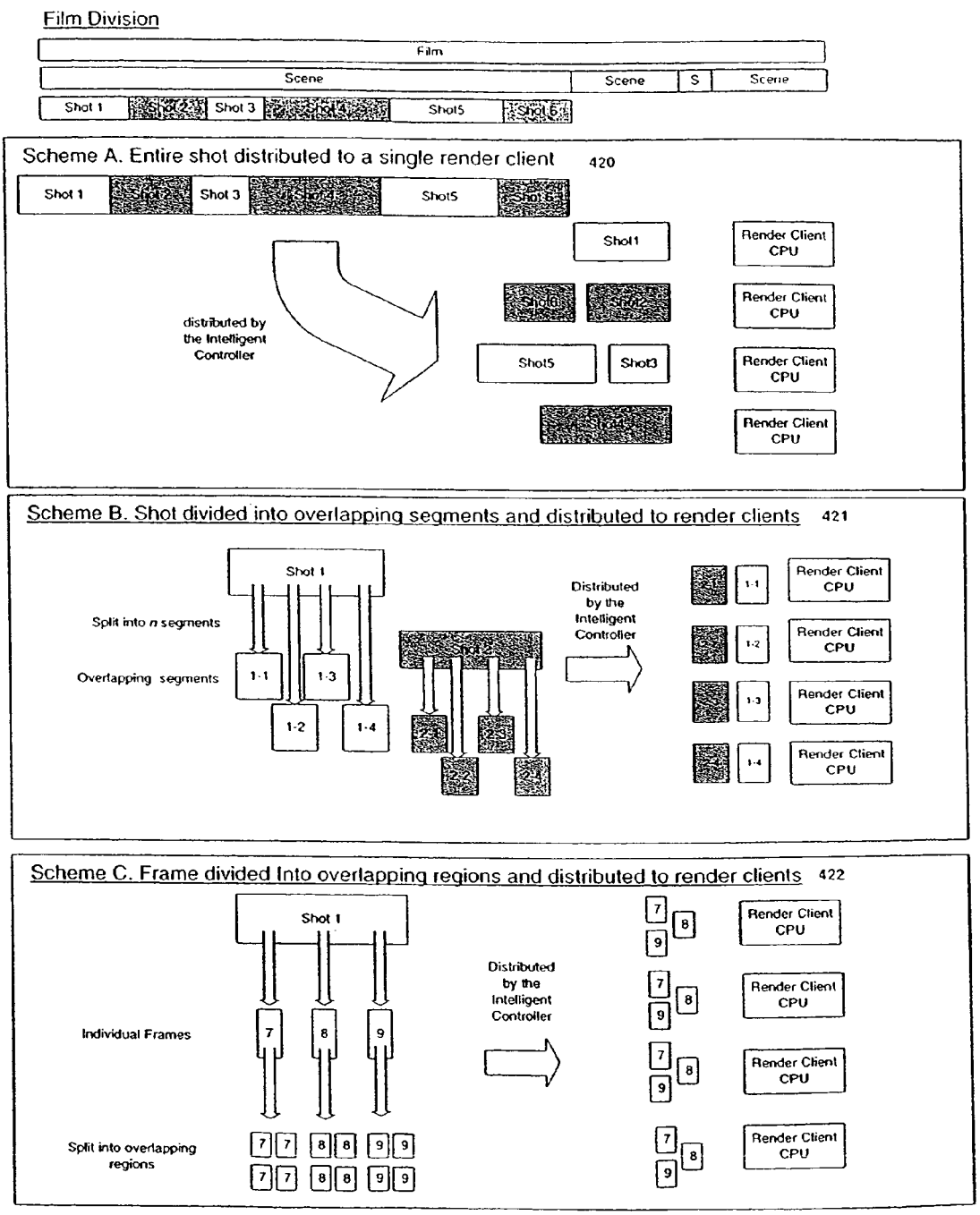
Figure 11:
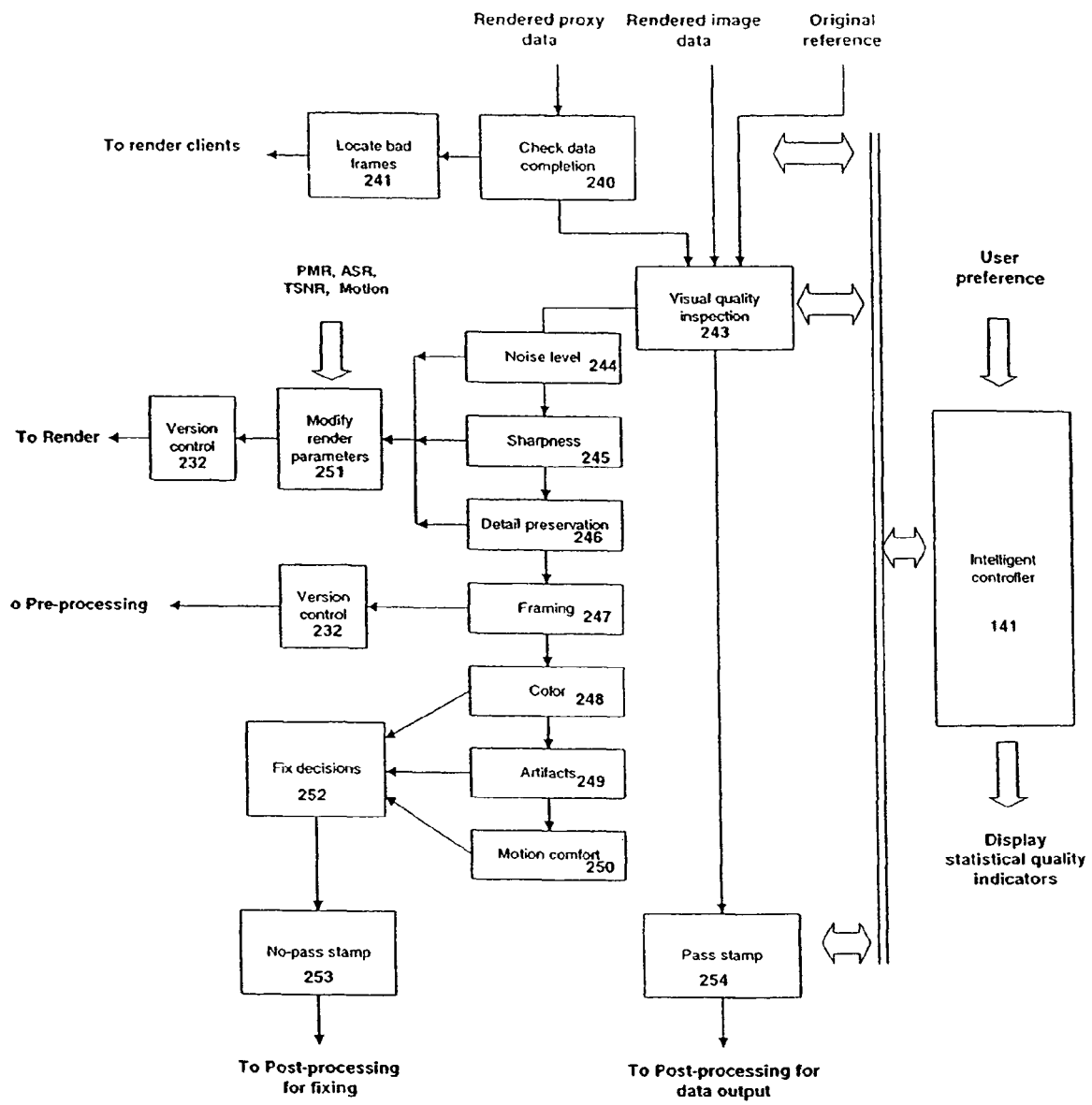
Figure 12:
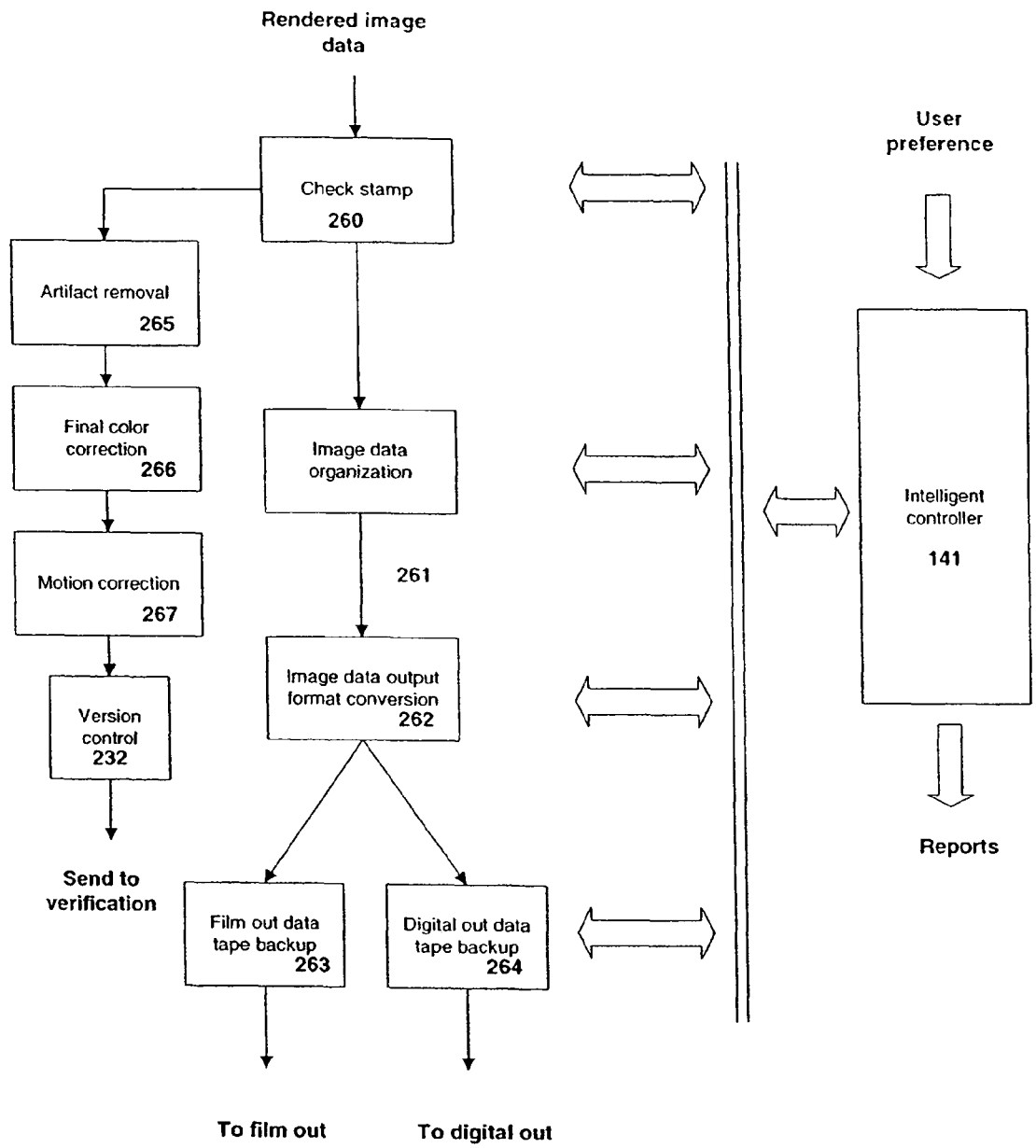

FIG. 6 describes the algorithm for automatic prediction of render parameters;

FIG. 7 describes the process pipeline of a render client;

FIG. 8 depicts a typical temporal filtering scheme with a temporal window;

FIG. 9 describes three temporal filtering schemes for noise reduction;

FIG. 10 depicts three schemes for render job distribution;

FIG. 11 is a process flow chart of the Verification module;

FIG. 12 is a process flow chart of the Post-processing module; and

Figure 13:
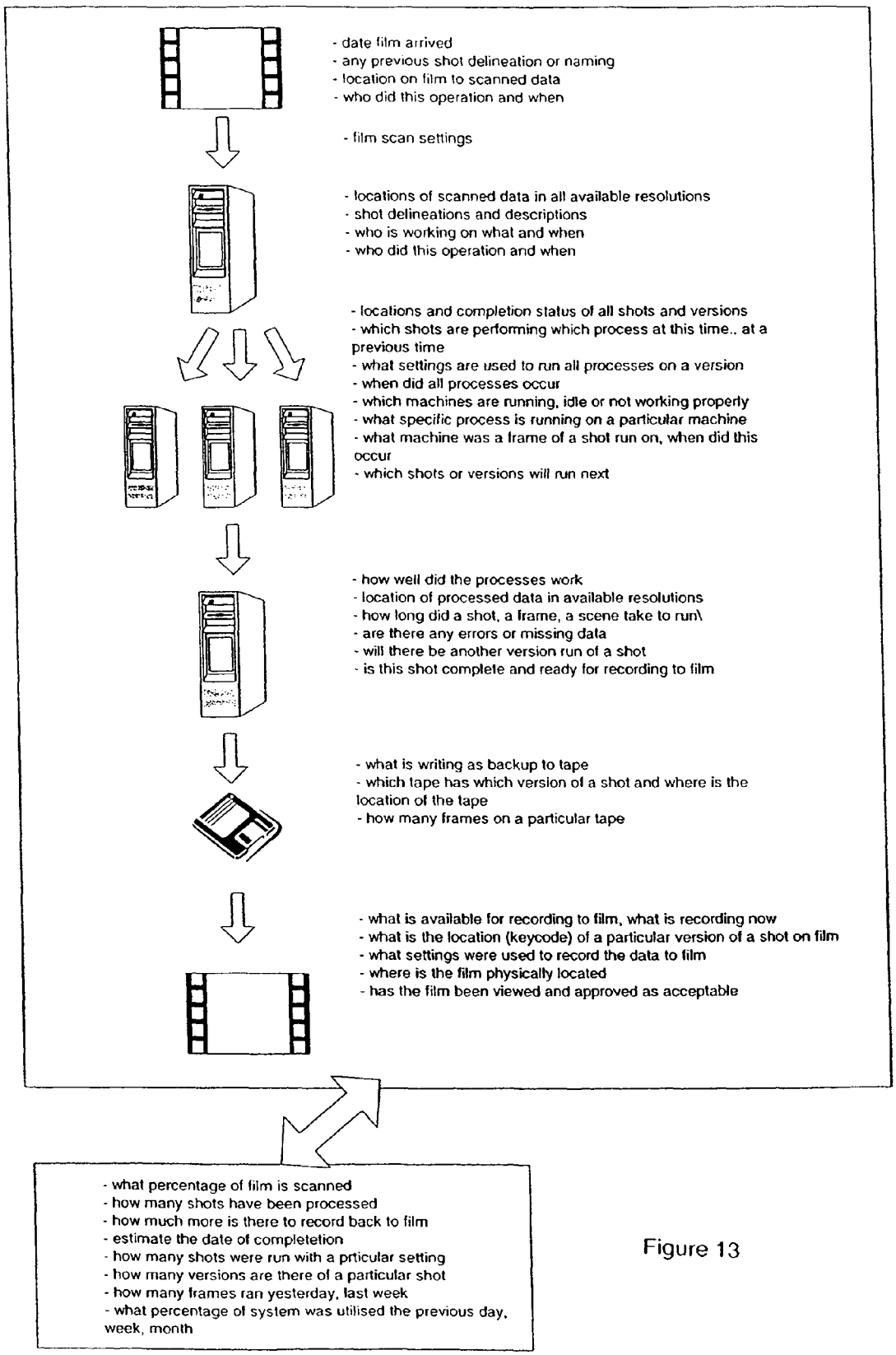

FIG. 13 shows an example of the types of production information that are tracked by the Intelligent Controller.

DETAILED DESCRIPTION

Figure 2:
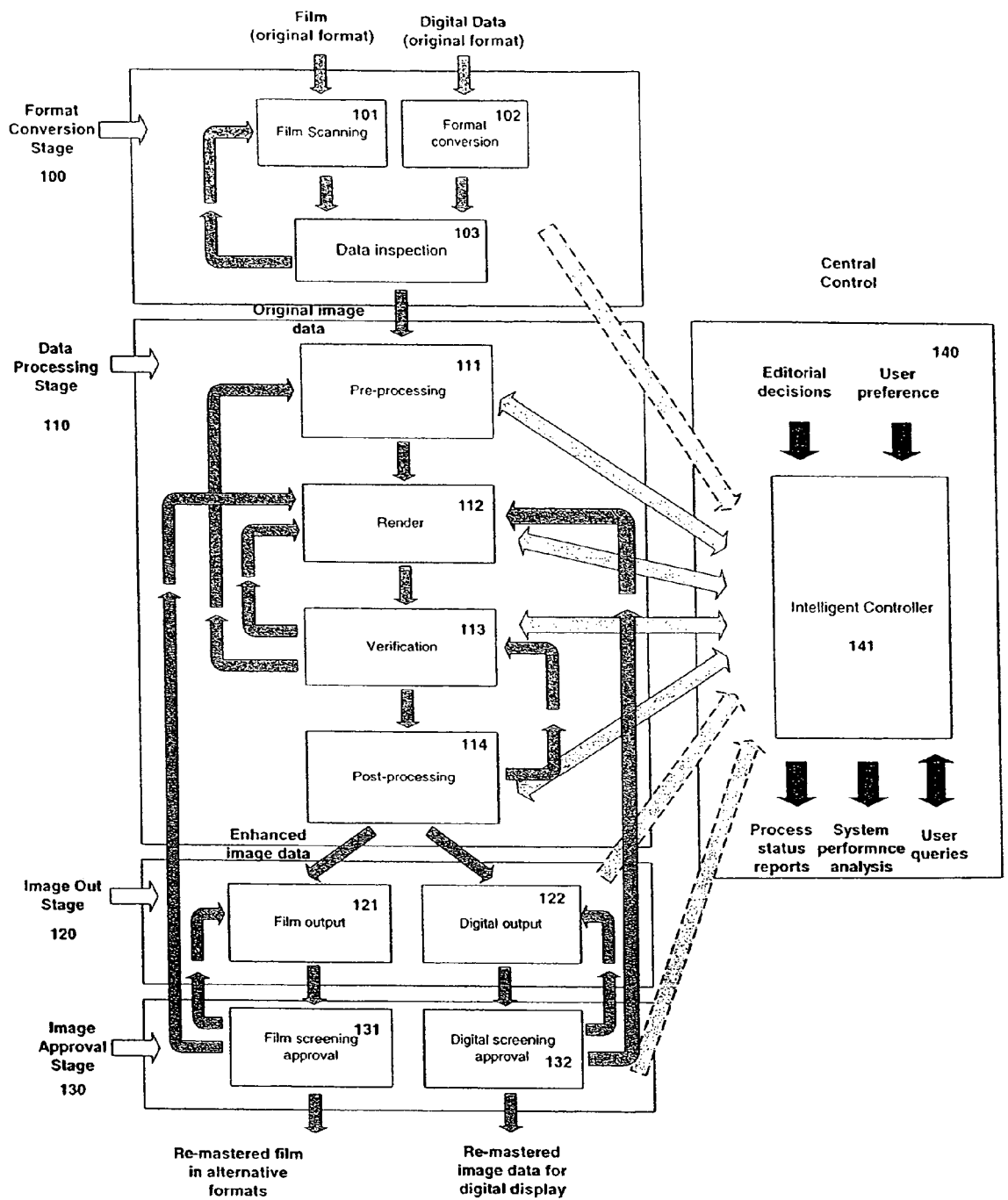
FIG. 2 is a process flow chart describing a digital re-mastering process for motion picture and other moving images.
Figure 3:
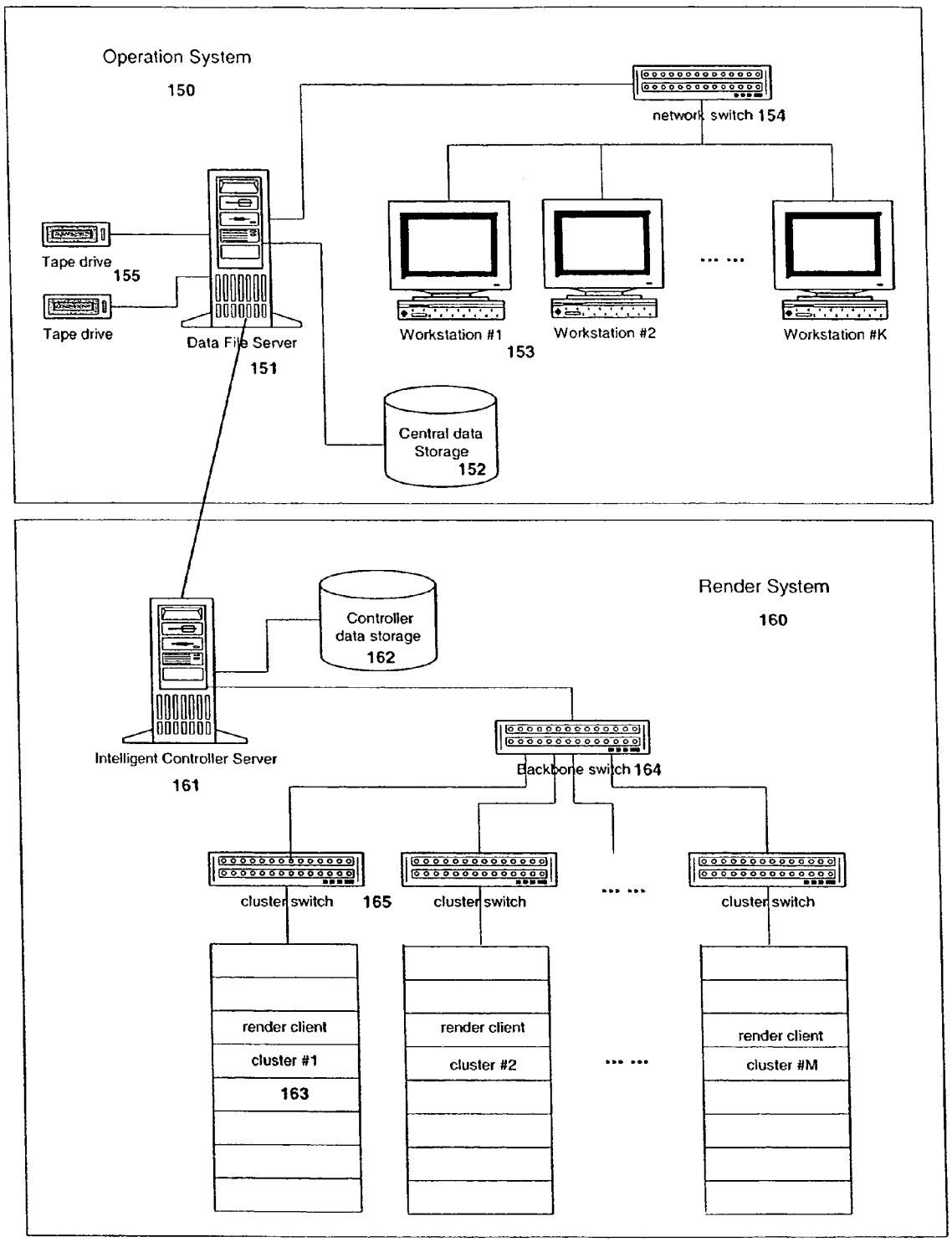
FIG. 3 depicts the system configuration of the Data Processing stage of the image enhancement system for motion picture re-mastering.

The present invention describes a process and methods for digitally re-mastering a motion picture or any moving picture sequence from its original format to an alternative format or its original format with enhanced image quality, as well as a system implementation of that process. The digital image re-mastering process is depicted in FIG. 2, and the system implementation of the process is depicted in FIG. 3. As depicted in FIG. 2, the digital image re-mastering process consists of four stages: Format Conversion 100, Data Processing 110, Image Out 120 and Image Approval 130. The process is controlled by a central control system 140, and at the heart of the central control is the Intelligent Controller 141. The Intelligent Controller 141 is implemented through a combination of hardware and software, and it controls and monitors every aspect of the process from tracking physical data flow to controlling actual task execution.

At the first stage Format Conversion 100, images of a motion picture or any moving images are converted to a digital format that can be handled by the Data Processing 110 stage. The majority of motion pictures originate in film (negative film or intermediate film), and need to be converted to digital format through a device called a film scanner (Glenn Kennel, "Digital Film Scanning and Recording: The Technology and Practice", *SMPTE Journal*, Vol. 103, No. 3, March 1994). A film scanner is a sampling device, and it converts each image sample from film density to binary digits representing red, green and blue (RGB) color components. The scanned data needs to have a sufficient bit-depth in order to preserve the full dynamic range of the images on film. In one embodiment of the invention, each image frame is sampled with a pixel pitch no greater than 6 µm, and each sample is quantized into RGB channels with 10-bit bit-depth for each channel. The scanned data is then packed in a file format called DPX (Digital Moving Picture Exchange) format (SMPTE 268M) or its earlier version named Cineon format. For images originated in a non-digital form other than film, the digitization process needs to support a sampling rate and a quantization level that preserves all the information of the original images. As motion pictures are increasingly produced and released in digital format, the available digital data can be directly converted from their original format to any other format through a digital conversion process 102. In one embodiment of the invention, the desirable format is the 10-bit DPX format or Cineon format. The format conversion process 102 typically comprises operations such as color space conversion, compression/decompression and bit-packing, as one skilled in the art will readily be able to adapt the process described by the teaching to any data formats. The converted image data must be visually inspected as correct through a Data Inspection process 103 so that errors in image data caused by incorrect setting of film scanners and other failures in the conversion process are identified. Another function of the Data Inspection 103 is to ensure that the converted image data meets a set of pre-defined quality standards including the preservation of dynamic range and image details. Image data that contains errors or does not meet quality standards is rejected to be re-scanned or re-converted.

The image data converted at the Format Conversion stage 100 is referred to as Original Image Data. At the next Data Processing stage 110, the Original Image Data is enhanced both in resolution and visual quality through an image enhancement process The image enhancement process comprises four process modules, and they are the Pre-processing module 111, the Render module 112, the Verification module 113 and the Post-processing module 114.

The Pre-processing module 111 comprises processes that depend on human user's decisions, such as shot separation, re-framing, color correction and scene classification. It also includes a process for identifying and removing artifacts existing in the Original Image Data. In one embodiment of the invention, all operations required for decision making are implemented by a combination of special-purpose software and user workstations that allow user interactions. The user's decisions are collected by the Intelligent Controller 141 that then instructs user's workstations to apply corresponding pre-processing operations to the Original Image Data. In another embodiment of the present invention, the actual pre-processing operations are implemented in the next Render module as part of render client process pipeline, and those operations are totally controlled by the Intelligent Controller 141 based on user's decisions. In another embodiment of the invention, decisions on color correction and artifact identification are made by image analysis algorithms so that those operations can be implemented in a fully automated mode without need for human intervention.

The Render module 112 is responsible for the enhancement of image data in both resolution and visual quality. The system implementation of the Render module 112 is a combination of hardware and software designed for achieving high throughput and high computational efficiency. In one embodiment of the present invention, the Render module mainly performs three types of enhancement operations to the image data: resolution-enhancement, noise reduction and sharpening. In another embodiment of the present invention, the Render module also performs additional pre-processing operations including color correction, re-framing and artifact removal. To achieve high throughput, the Render system implementation adopts a parallel computing architecture with multiple computing render clients controlled by the Intelligent Controller 141.

The Intelligent Controller 141 is responsible for maximizing render efficiency and delivering optimal image quality. It achieves this by using intelligent algorithms to compute the best solutions. In one embodiment of the invention, the operation of the Render module 112 is fully automated. The Intelligent Controller determines how image data is distributed among available render clients to achieve maximum efficiency. It also determines the best set of render instructions to be used to achieve optimal render quality. The Intelligent Controller constantly monitors the performance of the render operations and modifies its instructions. In the same embodiment of the invention, users are permitted to input their preference to the Intelligent Controller to be used for making render decisions and even overwrite decisions made by automated schemes. In another embodiment of the invention, users issue render instructions based on their experience and observation and constantly make changes to the instructions based on statistical performance analysis. In both embodiments of this invention, the quality of the enhanced image data is to be visually verified in the Verification module 113 to ensure they meet pre-defined quality and resolution criteria.

In the Verification module 113, the enhanced image data that does not meet the quality and resolution criteria is rejected and sent back to the Render module 112 to be rendered with a modified set of instructions or to be sent further back to the Pre-processing module 111 if problems are related to Pre-processing decisions. In one embodiment of the present invention, the Intelligent Controller 141 makes decisions on how to modify render instructions based on some statistical quality indicators calculated in the Render module 112. In another embodiment of the invention, users make modification decisions with the assistance of those statistical quality indicators. In general cases, image data does not pass the Verification module until it meets the pre-defined quality and resolution criteria. In special cases where image data contains certain artifacts that can be fixed at the Post-processing 114 module, the image data will be sent to the Post-processing module 114 for fixing before being sent back to the Verification module 113 for final evaluation.

The Post-processing module 114 performs certain final problem-fixing operations. The image data that meets all quality standards is organized before being sent to the Image Out stage 120. In certain cases, image data may need to be converted to the format specified by the film out process 121 or the digital out process 122. The enhanced image data is also written to permanent data storage, such as data tapes or optical discs, for data transfer or backup purposes.

Image Out 120 is a stage where enhanced image data of a motion picture is recorded onto an alternative film format, or re-formatted for digital display. In the case of film output 121, film recorders are used to transfer image data onto film, and the recorded film is processed with a standard laboratory process. A print film with correct timing is made using an optical printer. In the case of digital output 122, image data must be converted to the format suitable for digital display, and the operations involved in the conversion process may require resizing, color space conversion, re-framing and compression. Those skilled in the art will readily be able to convert the data described by the teaching to any output data formats.

The final stage is Image Approval 130, and it is performed by human inspection of the motion picture in an intended release format. In the case of film format, the print film is projected in a viewing environment representative to the cinemas where the motion picture is planned for release. The approval process can be done in segments or in the entirety of the motion picture. Those image segments that are rejected will be sent to appropriate earlier stages of the process to be re-processed. In the case of digital display, a similar screening process is performed using a representative digital display system. The approved images become the final re-mastered image product.

In the present invention, the physical facilities needed for each stage of the digital re-mastering process may not need to be located in proximity to each other. In one embodiment of the invention, the facility for each stage is located in a separate geographical location. The exchange of image data and other information between different locations can easily be done by electronic data transmission and through a courier service.

FIG. 3 depicts the system configuration of the Data Processing stage 110 implemented in a single location. It can be divided into two functional components. The first component is the Operation System 150, which supports all functions in Pre-processing 111, Verification 113 and Post-processing 114 modules. The Operation System 150 consists of a Data File Server 151, a Central Data Storage 152 with sufficient disk capacity, multiple workstations 153 equipped with special-purpose software tools for user interactive operations, a network switch that provides high-bandwidth connections between the file server and workstations, and a number of tape drives 155 that serve as data input and output devices.

The second component is the Render System 160, which supports all operations in the Render module 112. The Render System 160 consists of an Intelligent Controller Server 161, a Controller Data Storage 162 supporting the server, and multiple render client computing devices 163 configured in clusters. Given the processing time needed for each image frame, the number of render clients allowed for each cluster is limited by the bandwidth of the cluster network switch 165. A backbone network switch 164 provides high-bandwidth connections to all cluster network switches 165, and the number of clusters supported by the system is limited by the bandwidth of the backbone switch 164. The data transfer between the Operation System 150 and the Render System 160 is through a high bandwidth link between the Data File Server 151 and the Intelligent Controller Server 161. The system described in FIG. 3 has a modular design and is totally scalable to daily throughput requirement from a specific re-mastering project.

In one embodiment of the present invention, the Intelligent Controller Server also acts as the Data File Server, and the two data storage devices are combined into a central data storage. However, the preferred embodiment of the present invention is the double-server configuration depicted in FIG. 3. The separation of the Operation System 150 from Render System 160 allows user interactive operations to continue when the Intelligent Controller Server 161 needs to be powered down for maintenance or when a system failure occurs to the Render system 160. Similarly, the maintenance to the Operation System 150 or failure of the Data File Server 151 does not impact the operation of the Render System 160. In the configuration depicted in FIG. 3, the Central Data Storage 152 stores all image data required for Pre-processing, Verification and Post-processing. The Controller Data Storage 162 stores all information and data tracked by the Intelligent Controller and acts as a production database. It also provides a temporary storage for results from render clients before they are transferred to the Central Data Storage 152.

The Intelligent Controller Server 161 and the Controller Data Storage 162 are the fundamental hardware devices for the Intelligent Controller 141 that controls all operations in the Data Processing stage 110. The Intelligent Controller also monitors the process status of the Data Processing stage and collects information data from other stages that may be remotely located. Any device or process that accesses data from the Intelligent Controller 141 is treated as a client of the Intelligent Controller Server. This allows the Intelligent Controller to provide centralized control over the entire re-mastering process, track the status of all operations from every device and track all image data flow. Through a combination of software and hardware, the Intelligent Controller 141 performs the following functions:

Resource management—Given a project schedule, it automatically calculates the minimum daily throughput requirement and manages available resource to meet that requirement.

Quality optimization—It automatically determines the optimal set of render parameters for each render job for the best results. It also automates a quality evaluation process using statistical measures to determine if render results are acceptable.

Computing efficiency optimization—It manages the job queue, schedules and distributes each job to render clients in the most efficient way with available computing resources. It provides automated system-wide caching of intermediate data and process status, based on available storage resource, to minimize time required for necessary re-render jobs.

Production management—It tracks and updates all information relating to render process and flow of image data from every stage of the process and organizes the data into a database. It produces up-to-date reports on various aspects of the production process and answers user queries through a query builder.

System administration—It administrates all render clients and monitors their status, and it monitors system performance and diagnoses problems.

User interactivity—It takes user decisions and allows users to overwrite decisions made by automated schemes. It also makes decisions based on user preference specified by users.

The details of the four process modules of Data Processing stage are described in the following sections.

The Pre-processing module 111 is designed as a user-interactive process so that users can make creative decisions by pre-viewing image data using specially designed software. The Original Image Data, especially when scanned from film, is typically in the form of long image sequences with no breaks at scene changes. A major task in the Pre-processing module is to separate the data into shots, with each shot representing continuity in certain scene characteristics, such as motion or lighting. Each shot is marked by the start and end frame numbers and is assigned a unique shot number. In one embodiment of the present invention, those shots are further grouped into a smaller number of scenes in such a way that all shots belonging to the same scene share certain common characteristics. Scene grouping makes it possible to process all shots belonging to the same scene with the same set of parameters. The shot separation decisions are effectively made by skilled users, but they can also be made automatically by software through scene analysis.

Another key decision users need to make is re-framing. This operation is generally needed for a re-mastering project for the following two reasons: first, scanned data typically includes blank film areas outside the image area that must be cropped for final release; second, a re-mastered motion picture may be released in a different aspect ratio than it was originally intended. The re-framing decisions can be effectively made by skilled users. If the re-framing decisions change from frame to frame within a single shot, a Pan & Scan operation is needed as part of the re-framing process. Those skilled in the art will readily be able to perform the operation described by the teaching to satisfy any re-framing decisions.

Figure 4:
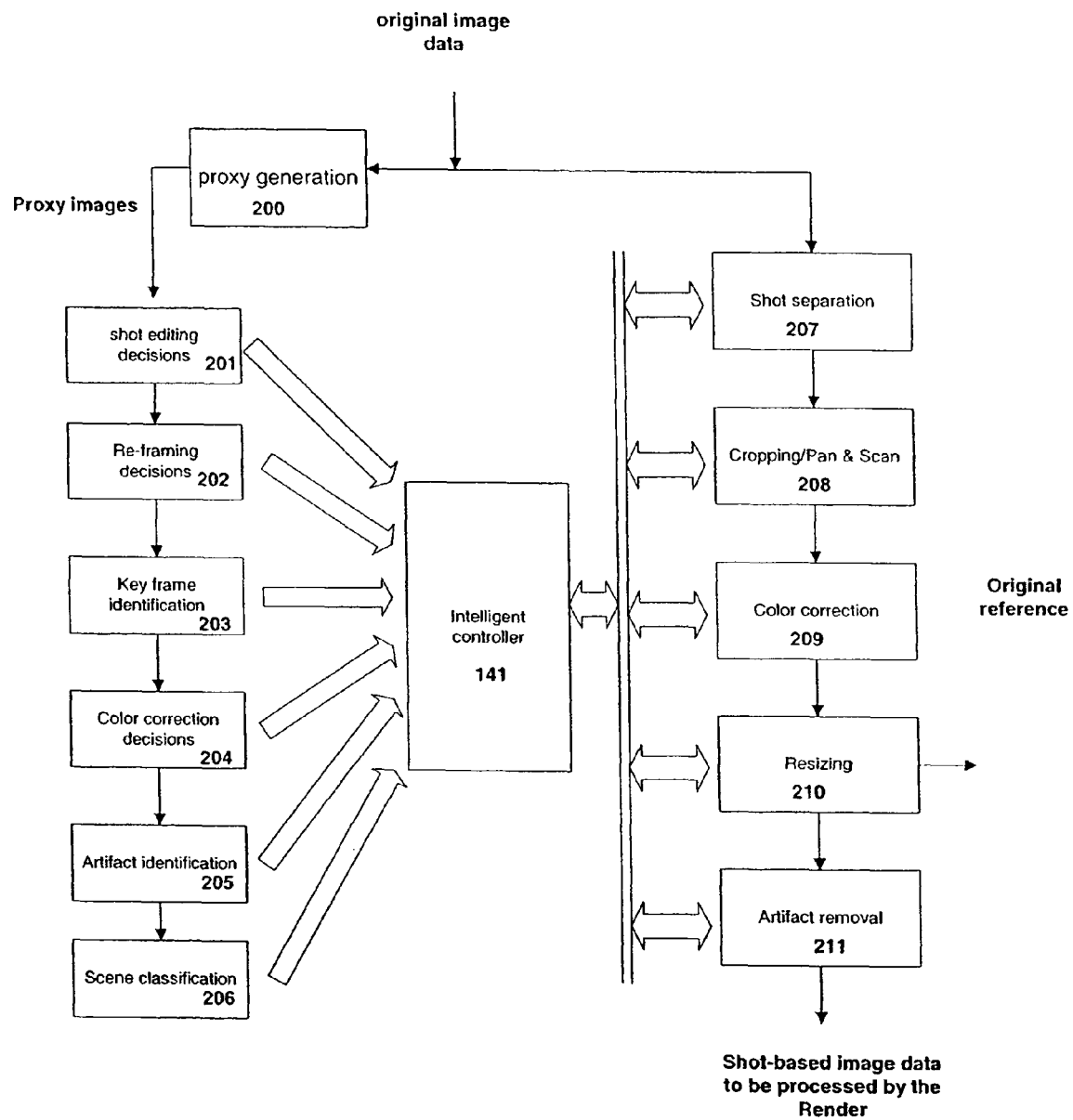
FIG. 4 is a process flow chart of the Pre-processing module.

FIG. 4 depicts a typical process of the Pre-processing module. User's decisions can be made based on direct pre-viewing of Original Image Data, or they can choose to pre-view a proxy version of the Original Image Data in order to reduce the amount of image data and shorten data loading time while increasing the run-time for each loading. In one embodiment of the present invention, the proxy version is created through a proxy generation module 200 that includes downsizing, bit-depth reduction and color correction. The size of the proxy version must be adequate for users to make Pre-processing decisions while small enough to ensure high efficiency in software pre-viewing. In another embodiment of the present invention, a modest data compression is applied to the proxy using standard compression technology to further increase visual pre-viewing efficiency without affecting viewing quality. By pre-viewing the proxy version of the image sequence, users can make quick and key decisions regarding shot editing 201 (the start and end frames for each continuous scene with a shot number), re-framing 202 (cropping and pan & scan based on a pre-determined aspect ratio), and color correction parameters 204. Users also select a small number of key frames 203 from each shot, which will be used in the next Render module for scene analysis. The Pre-processing also includes an artifact identification process 205 in which artifacts caused by dirt, film scratch, film degradation and chemical stain, as well as artifacts introduced in the digital effects stage can be identified and subsequently removed. Those decisions and the data determined by users are collected by the Intelligent Controller 141 which will apply appropriate image processing software tools to the Original Image Data to separate them into scene content based shot clips to be ready for render operations. In one embodiment of the present invention, the image processing tools include shot separation and file renaming 207, image cropping 208, color correction 209, image resizing 210 and artifact removal 211.

The proxy version of the Original Image Data is also used for scene classification 206. The purpose of the scene classification process is to group complex scenes into a relatively small number of classes so that images that belong to the same class share certain unique characteristics that makes them different from images of other classes. Scene classification makes it possible to apply different image processing methods and/or different render parameters to each class in order to achieve the best results. A sample of scene classes includes: fast motion scenes, slow motion scenes, still camera shots, dark scenes, bright scenes, scenes with large portion of sky, face close-up, wide-angle shots, nature scenes, etc. In one embodiment of the present invention, human users perform scene classification 206. In another embodiment of the present invention, scene classification is performed by automatic algorithms based on scene analysis. Each image is represented by a feature vector that may have a long list of components including color histogram, Gradient histogram, directional edges, motion, etc. When represented by feature vectors, images are treated as samples in a multiple dimensional feature space. Standard statistical clustering method can be used to group samples into preliminary classes. The second pass of motion similarity analysis on the thumbnail images may ensure samples with continuous motion remain in the same class. A special set of render parameters can be determined for each class through the render parameter prediction 220 described in FIG. 6.

Artifact removal 211 is necessary for a re-mastering project that demands high image quality. For Original Image Data scanned from film, artifacts resulting from dirt, dust and scratches on film are inevitable. Artifacts from film degradation and laboratory chemical process also occur especially for older film stocks. For Original Image Data available in original digital form, there may exist artifacts from imperfections in the digital-effects process. In one embodiment of the present invention, artifacts are removed through an automated process. Special search algorithms are applied to a range of frames including the current frame to identify artifacts with known unique characteristics. Pixels identified as artifacts resulting from dirt and dust display very different intensity values than surrounding normal pixels and these pixels do not have temporal correspondence from neighboring frames. Motion estimates of the surrounding normal pixels are computed. As dirt and dust artifacts are identified, they are replaced by predicted pixel values calculated based on the motion estimates of the surrounding normal pixels. Pixels identified as artifacts resulting from film scratches display very different intensity values than surrounding normal pixels, and these pixels are typically form thin vertical or horizontal lines (depending on film formats). These film scratch pixels can find strong temporal correspondence from neighboring frames. As film scratch artifacts are identified, they are replaced by predicted pixel values calculated by an interpolation algorithm based on surrounding normal pixels. The automated method is effective when the unique characteristics of the artifacts can be clearly defined. In another embodiment of the present invention, artifacts are removed by a semi-automated method. In this method, human users are needed only to identify a small image region that contains one or more artifacts present in image data using specially designed software 205, and the locations of those image regions are sent to the Intelligent Controller 141. Then a searching algorithm is applied to these identified small regions where artifacts are located to locate pixels with abnormality within the small regions. As artifact pixels are located, these pixels are replaced by predicted pixel values in the same way as in the automated embodiment of the present invention that was described. Since the motion estimation is confined within the identified small regions, the searching and removal algorithms can be completed within a very short time. For those artifacts that cannot be removed by either method, they will be re-touched by human users using standard re-touching software.

In one embodiment of the present invention, artifact removal 210 is performed both in the Pre-processing module 111 and in the Post-processing module 114, and a majority of artifacts are removed in the Pre-processing module. In another embodiment of the present invention, artifact removal is performed only at the Post-processing module. In the latter case, if a shot is rejected during the Approval stage 130 and needs to be sent back to the Render module 112 for re-rendering, then the artifact removal operation must be repeated. This will reduce operational efficiency if manual and semi-automated methods are used.

Figure 5:
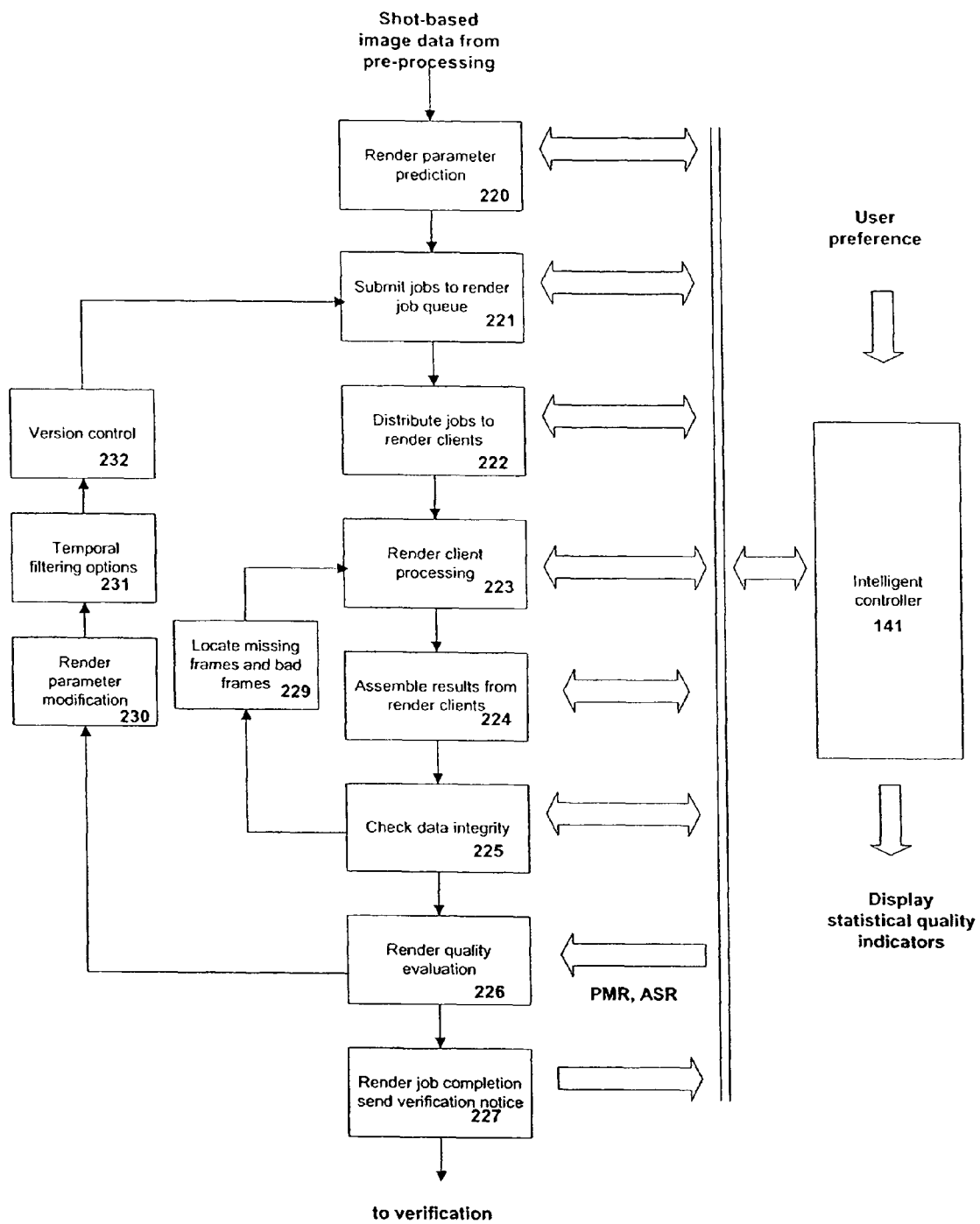
FIG. 5 is a process flow chart of the Render module.

The enhancement of the image data that has been separated into shots takes place at the Render module 112. The operation of the Render module is controlled by the Intelligent Controller 141 and is totally automated. FIG. 5 depicts the process flow diagram of the Render module. The hardware implementation of the Render module is the Render system 160 that is equipped with multiples of computing clients 163 configured into clusters (as shown in FIG. 3). Each computing client is a standard computing device. In one embodiment of the present invention, each computing client is a Pentium processor computer running on Linux operating system. When an image shot sequence, or a shot, is undergoing a series of image enhancement operations by render clients, it is referred to as a render job, or a job. A job can be distributed to a single render client or to a number of render clients. Each image enhancement operation provides one or more parameters that can be adjusted to achieve desirable results. The collection of all parameters from every enhancement operation forms a render parameter set, which determines the performance and the quality of render results. For image shots with different characteristics, the render parameter set must be adjusted accordingly in order to achieve the best possible visual quality.

The render parameter set contains parameters crucial for processing on the render clients 223, and these parameters include those for motion estimation (matching region of support, the number layers in the hierarchical motion model, searching range, thresholds for finding the correct matching, etc.), temporal filtering (temporal window size, filter coefficients, etc.) and sharpening. These parameters can be determined in a number of ways. In one embodiment of the present invention, the parameter set is predicted by a skillful user based on visual inspection of every image shot. This approach is only effective if the user's decisions are consistent and reliable. In another embodiment of the present invention, the render parameter set is estimated by a prediction algorithm based on image analysis 220.

The algorithm for render parameter prediction is depicted in FIG. 6. In order to reduce computation, image analysis is performed on a sample of image frames selected from a shot sequence. These sample frames are called key frames, and they are selected by users at the key frame identification process step 203 in the Pre-processing stage. In another embodiment of the present invention, key frames can also be determined by an algorithm 300 that computes the histogram of each frame in the shot and determines the most representative frames based on histogram consistency.

A series of image analysis operations are applied to the selected key frames. In one embodiment of the present invention, those operations are for the purpose of estimation of initial motion estimation settings 301, including:

Estimation of granularity of the image noise distribution 302;

Estimation of matching region of support (MRS) based on the estimated noise granularity 303;

Estimation of global motion by calculating the average absolute motion between key frames 304; and Estimation of searching range based on estimated global motion 305.

Using the estimated matching regions of support and estimated searching range, a motion estimation algorithm can be applied to key frames to compute the motion estimates from key frames 306. A variety of motion estimation algorithms are applicable for this application, and those algorithms are described in the following publication: Christoph Stiller and Janusz Konrad, "Estimating Motion in Image Sequences", *IEEE Signal Processing Magazine*, Vol 16, No.4, July 1999. In one embodiment of the present invention, a pixel-based motion estimation algorithm based on a hierarchical motion model is implemented.

Based on computed motion vectors at multi-resolution layers, some key statistical measures regarding image temporal characteristics are calculated 307, and they include:

Temporal Signal-to-noise Ratio (TSNR) 308—TSNR measures the level of temporally uncorrelated noise between key frames. TSNR is computed, after motion estimation, by warping one of the key frames to the others based on motion vectors, and then calculating the inverse of MSE (mean square error). TSNR is measured in dB, similar to conventional SNR used for signal analysis. If TSNR is high, then the temporal noise is low, and vice versa.

Motion 309—The amount of motion that exists in a shot is measured in two ways. In one embodiment of the present invention, motion is measured by the average absolute magnitude of motion vectors of all pixels that can be reliably tracked between key frames. In another embodiment of the present invention, motion is measured based on the average motion of feature points. Feature points generally provide more reliable motion estimates than average pixels. However, estimating the motion of feature points requires a different algorithm and the process must be implemented separately from pixel-based motion estimation.

Fast Matching Distribution (FMD) 310—FMD is a distribution of percentage of direct pixel match (fast match) between two key frames vs. matching threshold values. The direct match of pixels between two frames occurs when a matching is found within a pre-defined small search region. FMD is an indicator of the performance of a motion estimator. For a given FMD, there is a set of corresponding threshold values that delivers the desirable performance.

A prediction algorithm 311 predicts render parameters based on FMD, TSNR and Motion. In one embodiment of the present invention, the prediction starts with a set of matching threshold values corresponding to a given FMD. That set of those threshold values is weighted down when TSNR is high or when Motion is high, and weighted up when TSNR is low or when Motion is low.

The operation of the render parameter predictor 220 is controlled by the Intelligent Controller 141. User input can be fed into the parameter predictor 311 to modify predictions according to the preference of the users. The predictor 220 also allows users to overwrite its prediction with a preferred set of render parameters.

Turning back to FIG. 5, once a render parameter set is determined for an image shot, it can be submitted to the render queue 221 as a single render job. The Intelligent Controller 141 checks the validity of the submission and adds the job to a job queue 221. It then sends the job submission off to one or more available render clients for processing based a predetermined job distribution scheme 222. The render clients 223 process the data according to instructions and compute statistical quality indicator 323. The clients also frequently report back to the Intelligent Controller 141 their current situation and status. Once the job is completed, the Intelligent Controller collects distributed results from corresponding clients and temporarily stores them on the Controller data storage 162. Then it checks the integrity of the data and the completeness of the job 225. If the Intelligent Controller 141 finds certain frames are missing, or certain frames are incomplete, it requests the render client to re-process those frames. If it is satisfied that the job is complete, it performs an evaluation 226 to measure the quality of the rendering. If the required quality is not achieved, the Controller attempts to modify the render parameter set 230 and sends the job back to the job queue. In special cases, it requests that certain temporal filtering options (see FIG. 7 and FIG. 9) be specified 231. For each job re-submission, the version of the job is updated through a version control scheme 232. If the Intelligent Controller is satisfied with the render results, it sends the image data to the Central Data Storage 152 and sends a verification notice 227 to the Data File Server 151.

The processing performed by each render client 223 on image shot data consists of a series of image processing operations as depicted in FIG. 7. The major operations include temporal filtering 322, resizing 326 and sharpening 327. The render client also computes statistical quality indicators 323 including pixel matching ratio (PMR) and absolute still ratio (ASR). These quality indicators are used to evaluate render quality in the quality evaluation stage 226 in FIG. 5. In addition, a proxy version of the enhanced image shot is created to be used for visual inspection at the Verification module 113 in FIG. 2. Once a job is completed, the render client notifies the Intelligent Controller 141, and it will store the results at the Controller Data Storage 162 and free the render client. The steps in the process pipeline of a render client are discussed below. All of the steps are not necessarily used in every application. FIG. 7 illustrates the preferred order of the process steps in one embodiment.

Temporal filtering 322 is the most computationally intensive operation currently implemented in the render client processing pipeline. It provides two functions: resolution enhancement 340 and noise reduction 341. The concept of resolution enhancement was developed based on images originating on photographic film, but the methods developed based on the concept are not limited to film-based image applications. In fact, the resolution enhancement method described in the present invention is applicable to any image sequence captured using some form of optical device, like photo detectors, electronic sensors and computer-generated images that have been transferred to the above media.

Photographic film contains tiny light sensitive crystals of silver halide salts. When the film is developed these crystals are turned into tiny filaments of metallic silver. In a color film, tiny blobs of dye are formed along with the silver during the development process. The silver is then chemically removed from the film, leaving only this dye image. It is these small specks of dye that form film grain. Film grains vary in size and shape and are randomly distributed. But the randomly distributed film grains actually are the fundamental building blocks that form images on film.

Figure 1:
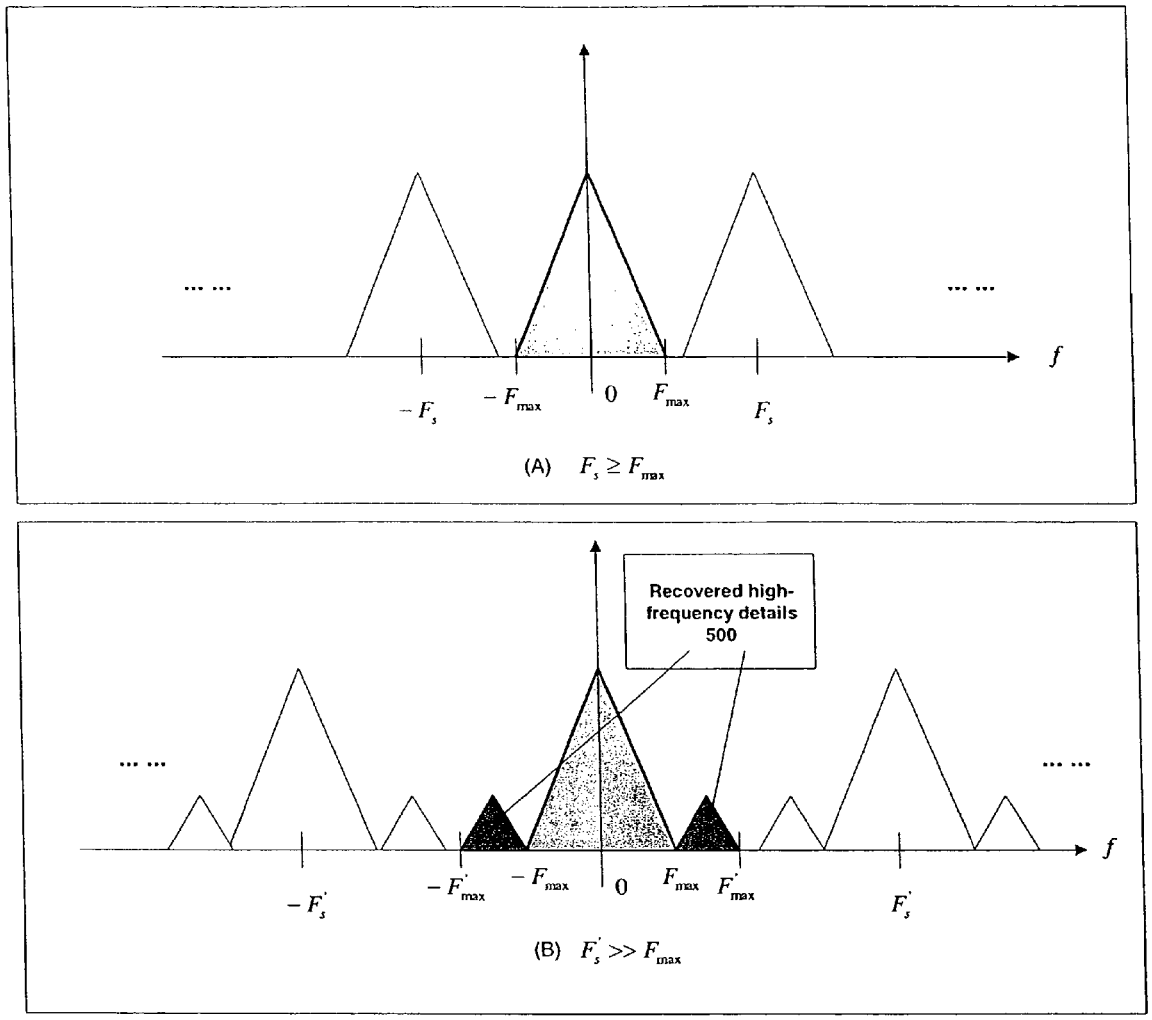
FIG. 1 depicts the concept of spatial resolution enhancement represented in the frequency domain.

The information contained in a single frame of image can be completely described by its frequency domain content. When an image frame is digitized, the information retained in the digital version is limited by the sampling theory. Digitally enlarging a digital image frame using resizing methods does not add more information, but it makes room in the frequency domain so that additional image details can be added to the image frame if those details can be recovered elsewhere. This concept of resolution enhancement is depicted in FIG. 1. FIG. 1(A) illustrates the frequency response of a band-limited image signal sampled at Nyquist frequency $F_s \geq 2F_{max}$; and FIG. 1(B) illustrates the frequency response of the same image signal with additional high-frequency components recovered from resolution enhancement process. The image signal is sampled at $F_s' >> 2F_{max}$, and it makes it possible to add high-frequency details recovered from other image frames. The spatial resolution of the enhanced image signal now becomes $F_{max}' > F_{max}$.

In one embodiment of the present invention, additional image details are recovered from neighboring frames through temporal filtering. In temporal filtering, the content of an image frame is enhanced by a mathematical algorithm that uses information from neighboring image frames, as depicted in FIG. 8. The number of neighboring frames (including the present frame) used by the temporal filter is referred to as a "temporal window". For example, the size of the temporal window 401 used by the temporal filter 400 in FIG. 8 is 2N+1. By moving the temporal window 401, successive image frames are enhanced by the temporal filter 400.

The method of resolution enhancement 340 described in the present invention consists of three major steps: motion estimation, motion field regulation, and detail recovery. A motion estimation algorithm with sufficient accuracy and robustness is the first essential step. The existence of random film grains in varying sizes and shapes in photographic images presents challenges to any motion estimation algorithm. A motion estimation algorithm must be able to distinguish real image content from random film grain details. A range of well-known motion estimation algorithms are qualified for this application, and most of them are described in the following publication: Christoph Stiller and Janusz Konrad, "Estimating Motion in Image Sequences", *IEEE Signal Processing Magazine*, Vol 16, No.4, July 1999. In one embodiment of the present invention, an algorithm based on a hierarchical motion model is used to achieve both reliability and accuracy. In this method, motion is modeled at multiple levels of details, making it possible to find major motion properties first and refine the estimate to details later. In the hierarchical motion model, every image frame is represented by a multi-level data structure, each representing a specific level of image details. Film grain details are mostly represented at the lowest level of the hierarchy. Motion estimates calculated at the top levels of the hierarchy represent real image contents. At each level of the hierarchy, the motion estimate of every pixel is computed using a variable-size block matching algorithm for all frames within a temporal window. The searching strategy used in block matching varies from an exhaustive search to sub-optimal fast search. In an exhaustive search, all candidates within a predefined searching range will be examined, and the best match is the one that minimizes a prediction error. In a fast search, the "best match" criterion is replaced by a "first match" criterion which takes the first candidate with a prediction error below a certain set of threshold criteria as the estimate. The "coarse" motion estimate obtained at the top level is computed as the best match among all candidates. This motion estimate is successively refined over subsequent levels of hierarchy. This hierarchical search strategy confines the search within a relatively smaller range at each level so that the computational complexity will be significantly reduced. At the bottom level, where film grain structure becomes significant, it is necessary to apply a search strategy that is robust to film grain variance. Since film grain size changes according to film stock, lighting conditions, laboratory process, etc. the matching regions of support must be sufficiently larger than the maximal film grain size.

Motion field regulation is necessary since motion estimation is an ill-posed problem and multiple solutions exist given a set of searching criteria. Most estimation errors occur in smooth regions of images where the size of potential solution space increases drastically. The approach is to constrain the solution space using such constraints as high-frequency features, smoothness and quality measure. High-frequency features are "visually significant" image features that can be identified through feature analysis, and they represent significant changes in pixel intensity, pixel color or pixel motion. The motion estimates obtained from pixels representing high-frequency features are more reliable and more accurate than those obtained from pixels in smooth region. The smoothness constraint states that neighboring pixels in a smooth region are most likely to share similar motion estimates. For high-frequency features, the smoothness should apply in the direction of feature orientation. Each motion estimate is assigned a reliability measure indicating the reliability of its estimate. The reliability measure of a motion estimate is in inverse proportion to the size of solution space associated with the estimate. For a pixel with a lower reliability measure value, motion field regulation should be considered, and more constraints should be applied to its solution space in order to reduce the estimation error.

To achieve sub-pixel accuracy at a given frame interval, a group of synthesized frames are constructed by mapping each neighboring frame to the present frame intervals based on the corresponding motion estimates. An error map between each synthesized frame and the present frame is calculated. For those pixels with large estimation errors, their motion estimates are modified until the errors are minimized. Further improvement of estimation accuracy can be achieved using more sophisticated motion models like six-parameter affine models or eight-parameter projective linear models. The synthesized frames are re-created based on the modified motion estimates, and they will be used in the detail recovery step.

A resolution-enhanced image 403 is constructed through adaptive temporal interpolation of synthesized frames within the temporal window 401. An adaptive temporal filter 400 with FIR (finite duration impulse response) structure is applied to each pixel location. The filter coefficients are determined based on the motion estimate reliability measure associated with each pixel. If a motion estimate is highly reliable, the filter coefficients are weighted in proportion to the reliability measurements from each frame interval. On the other hand, if a motion estimate is unreliable, the filter coefficients are weighted more heavily on the current frame.

Although the previous description of the temporal filtering is based on photographic images, it equally applies to images captured using some form of optical device including photo detectors and electronic sensors as well as computer-generated images that have been transferred to the above media.

A direct result from resolution enhancement 340 is the reduction of the visual sensation of "boiling" film grain in the enhanced image sequence 403. As noted earlier, film grain varies in size and shape and is randomly distributed spatially and temporally. This random pattern creates the "boiling" grain phenomenon when images are viewed in motion. In a large format cinema, audiences are typically seated closer to the screen than they are in a regular cinema so that images cover a much wider portion of their field of view. This results in the "boiling" film grain becoming visibly objectionable and is perceived as undesirable noise. The temporal filtering method 400 suppresses "boiling" film grain noise because it improves temporal correlation between neighboring image frames in a sequence. Furthermore, film grain is also reduced as the result of enhanced spatial resolution.

The single-pass temporal filtering algorithm depicted in FIG. 8 can be implemented in parallel processing mode since each output frame can be computed independently. For a majority of image shots, the single-pass temporal filtering is very effective in noise reduction. However, for very noisy images, or for jobs where noise level is a major concern, other noise reduction algorithms 341 can be applied. In one embodiment of the present invention, noise reduction 341 is achieved with multi-pass temporal filtering following one of the three methods depicted in FIG. 9. The actual temporal filter device 400 is omitted in FIG. 9 for clarity of the description, as one skilled in the art will readily be able to implement those algorithms described by the teaching.

FIG. 9(A) describes a multi-pass temporal filtering algorithm 410. The multiple-pass algorithm basically repeats the single-pass scheme multiple times. Render parameters prediction described in FIG. 6 is applied before each pass. The multi-pass temporal filtering is effective in suppressing noise in very noisy images.

FIG. 9(B) describes a multi-pass algorithm 411 based on a temporal pyramid. The "temporal" sampling is "coarse" in the first pass and every N number of frames within a temporal window is used. The temporal sampling rate increases for the next pass until every neighboring frame within the temporal window is used in the final pass. Temporal pyramid filtering tends to reduce the computation required for the scheme described in FIG. 9(A).

FIG. 9(C) describes a serial temporal filtering algorithm 412 that can be implemented as an iterated process. The previously processed frames are used immediately for processing the next frames. The algorithms depicted in FIG. 9 generally perform better in noise reduction, but they tend to reduce image details compared with the single-pass algorithm of FIG. 8. Certain criteria can be defined in the temporal filtering options process 231 (as shown in FIG. 5) to select the most appropriate options for temporal filtering based on image noise level represented by the TSNR that is calculated at process 308

FIG. 5 shows that the render quality evaluation process 226 is implemented to evaluate render performance based on statistical quality indicators computed by render clients during temporal filtering 323. In one embodiment of the present invention, the quality evaluation algorithm is based on PMR (pixel matching ratio) and ASR (absolute still ratio). PMR and ASR measures the impact of actual temporal filtering operations performed to each image frame, and they are good indicators for render parameter predictions that are out of normal range. The PMR and ASR are used to predict render parameter modifications required to achieve better results.

PMR measures the percentage of pixels that were reliably estimated over a range of frames within the temporal window. In temporal filtering, not every pixel can find correspondence over every frame inside a temporal window. Some pixels can only be tracked over fewer frames, and some pixels are unable to be tracked at all. PMR is a distribution of the percentage of each type of pixels over the range of frames that they can be tracked. A PMR that peaks at the high end (more frames) indicates that the majority of pixels are reliably tracked over the entire temporal window. On the other hand, a PMR that peaks at the low end (fewer frames) indicates that the motion estimation algorithm has trouble in tracking that image. A high PMR distribution suggests that the current image frame is relatively clean, but it can also indicate an improper render parameter setting (matching thresholds too higher, MRS too small, for example). A low PMR distribution may suggest a very noisy image, but it can also indicate incorrect parameter settings (low matching thresholds, MRS too large, for example).

ASR measures the distribution of pixels that can easily be tracked over a range of frames without significant searching effort. Those pixels that remains at the same location throughout the entire range of temporal window are called "absolute still pixels". In another embodiment of the present invention, the absolute still pixels include those with small changes in their positions. The peak of ASR is high for images with little motion, and it is low for images with significant amount of motion. However, if ASR is high for images with reasonable amount of motion, then it may indicate improper setting of render parameters (thresholds too high, search range too small, etc.).

In one embodiment of the present invention, the render quality evaluation process 226 is an automated process. For each class of scenes determined at the scene classification process 206, a standard profile of PMR distribution is predetermined which represents average PMR distributions of scenes in the same class. Similarly, a standard profile of ASR is also determined. The evaluation algorithm 226 compares the PMR and ASR of the current job with those standard profiles and determines if temporal rendering applied to the job is within a normal range. If the current job has a very different PMR or ASR distribution compared with standard profiles, then the job is rejected and sent back to the same render clients for re-rendering with a modified set of render parameters.

The render parameters estimated by the parameter predictor 220 might not be optimal for local variations of image characteristics. One example is noise distribution. It is well known that film grain has a non-uniform distribution vs. film density. Film grain is most evident in the midtones of a print, which presents a density range about 0.6 to 0.9. Film grain also tends to increase when camera exposure decreases. Similar non-uniformity exists for images captured using an electronic camera, where noise level tends to be high in darker areas. The non-uniformity of the noise distribution can also be the result of non-linear conversion (logarithmic, gamma, etc.) commonly used in file format conversion.

Turning again to FIG. 7, in order to effectively suppress noise in darker areas without affecting image quality in other regions, a noise equalization algorithm 321 is applied to images to keep noise distribution uniform before temporal filtering. The algorithm consists of the following steps. The first step is to calculate the noise histogram. A full-search motion estimation is performed on a pair of frames selected from key frames using a set of relatively large thresholds. Then block matching errors are calculated for every pixel. For those pixels with a low block match error, calculate the histogram and compare it with a standard histogram. The noise histogram is a good representation of the noise and pixel luminance relation. The MSE between the noise histogram and a uniformly distributed histogram is calculated. If the MSE value is large, then the noise distribution of the images are considered non-uniform. Find a transform (in a form of a lookup table) that can equalize the noise histogram, and ensure it also has an inverse transform. Finally, apply the transform to the images before temporal filtering. After the temporal filtering, the inverse transform 324 must be applied to the images in order to retain its original color.

The underlining assumption of a motion estimation algorithm is that there is no abrupt color change between neighboring frames. However, this assumption breaks down when there is lighting change in a scene, such as lightning, flickering campfire, moving shadows, etc. Without a proper compensation, the effectiveness of temporal filtering 322 will be reduced. In one embodiment of the present invention, the lighting compensation algorithm 320 starts with selecting the brightest frame as the reference, and then it tries to find a transform for every frame to match the reference. Those types of transforms include gamma curves, histogram stretch or other monotonic non-linear transform. The transforms can be found by matching histograms of a frame to that of the brightest frame. In order to maintain smooth transitions between frames, a temporal filter can be applied to the transforms to ensure temporal consistency. Once the transform for each frame is found, apply it to each frame before temporal filtering, then apply the inverse transform 325 to the enhanced data to retain their original color. This method is suitable for sequences with frequent but relatively small lighting changes.

In another embodiment of the present invention, lighting change compensation can also be implemented as an adaptive mechanism of temporal filtering 322. In this method, the histogram of every frame is compared with every neighboring frame within the temporal window. Then all neighboring frames are compensated against the current frame as the reference in a similar method, as described in the previous paragraph. Since the algorithm always uses the current frame as the reference, no inverse transform is needed for this adaptive lighting compensation algorithm. This method is suitable for scenes that contain infrequent but strong light changes.

If noise equalization 321 and lighting change compensation 320 are both needed for a render job, the lighting change compensation 320 should be applied before the noise equalization 321. In another embodiment of the present invention, the transforms of both stages are combined into a single transform so that it can be applied only once.

Sharpening 327 is the last step of the render client pipeline, and it emphasizes the high frequency components of an image. Since the recovered image details from resolution enhancement are mostly high frequency components, sharpening can significantly improve image quality. Sharpening can also be modeled as a process to recover MTF loss over the process of image formation. MTF represents modulation transfer function, and it is used to analyze the quality of an imaging system. For example, the quality of images resulting on film can be modeled as multiplication of the MTF of individual devices in the process. These devices may include camera optics, negative film, printer film, and printer and scanner optics. Since the majority of these devices has low-pass MTF, the combined MTF of the imaging formation process must have a low-pass MTF. Therefore, a desirable sharpening algorithm should display high-pass MTF characteristics in order to correct the degradation of image quality.

A standard unsharp mask filter is such a sharpening algorithm, and it can be described by $$y(x, y) = f(x, y) + g(x, y) \cdot [f(x, y) - LP(f(x, y))] \quad (1)$$

where $LP(f(x, y))$ is a low-pass filter. The term $f(x, y) - LP(f(x, y))$ exhibits a high-pass characteristic, and the unsharp mask filter boosts it by multiplying with a sharpen gain $g(x, y)$. The boosted high-frequency components are added to the original image $f(x,y)$. The filter gain $g(x,y)$ is usually a constant, but it can be made adaptive based on local characteristics. At smooth regions, small filter gain should be selected so that the unwanted characteristics, like film grains, will not be emphasized.

One problem with the standard unsharp mask filter is that the range of high-frequency components that are emphasized is limited by the kernel size of the low-pass filter in equation (1). By varying the kernel size of the low-pass filter, different levels of image details, corresponding to different sections in the MTF curve, can be selectively emphasized. For motion picture images that usually contain a relatively large range of image details, it is important that sharpening improves system MTF over a relatively broad range of detail levels. To achieve that goal, the present invention generalizes the unsharp mask filter of equation (1) to support multiple levels of details by the following description:

$$y(x, y) = f(x, y) + \frac{1}{k}\left\{\sum_k g_k(x, y)[f(x, y) - LP_k(f(x, y))]\right\} \quad (2)$$

In equation (2), the sharpening gain value $g_k$ for the kth detail level can be selected to compensate for the MTF degradation at that particular detail level. In one embodiment of the present invention, Gaussian low-pass filters are used in equation (2), and up to six levels of kernel sizes are deployed. Those skilled in the art will recognize that the present invention is not limited to Gaussian filter and six levels of details. Other types of low-pass filters and more detail levels are possible following the teaching of the present invention.

The Render module depicted in FIG. 5 is specially designed for achieving high efficiency for image processing tasks that require temporal operations. The Intelligent Controller 141 manages render job distribution and assigns jobs to specific render clients based on a pre-determined load-balancing scheme. If there are multiple available candidates, the Intelligent Controller checks the network traffic load distribution among render client clusters 163 and selects a render client (or render clients) from the cluster (or clusters) with the lowest traffic load. For each job in a queue, it may assign it to a single render client, especially when there are more jobs waiting in the queue than the number of available render clients, or it may assign the job to a multiple of render clients, especially when the job needs to be completed as quickly as possible. In one embodiment of the present invention, the job distribution process 222 follows one of the three schemes depicted in FIG. 10.

In Scheme A 420, each shot is always assigned to a render client, and it will be sent to a render client with the shortest waiting time. For instance, if two render clients are available, the job will be assigned to the render client which has fewer frames in waiting to be processed. If both render clients have the same amount of waiting time, the job will be sent to the render client whose cluster has the least amount of load. In Scheme B 421, a single shot is split into a number of segments, and each segment contains at least a minimal number of frames. Each segment is distributed to a render client following the same "shortest waiting time and least amount of load" criteria. There should be sufficient frame overlapping between segments so that each segment is correctly rendered by temporal filtering. The amount of overlapping frames needed is determined by the temporal window size. The Intelligent Controller 141 must always be aware of the current temporal window size used in the temporal filtering and calculates the required overlapping frames. In Scheme C 422, each frame is further divided into regions, and each region is distributed to a render client. Due to the nature of motion estimation, sufficient overlapping rows and columns must be allowed for in each region in order to accommodate the search strategy deployed by the motion estimation algorithm. Those skilled in the art will recognize that the present invention is not limited to the three schemes depicted in FIG. 10, and other job distribution schemes are possible following the teaching of the present invention.

Each render client, once instructed to run a job, is responsible for pulling all image data it requires from the Central Data Storage 152, executing required operations on each frame and pushing the enhanced image data to a temporary location at Controller Data Storage. For a job that was distributed to multiple render clients, the Intelligent Controller is responsible for assembling 224 rendered segments from render clients into a continuous shot. The Intelligent Controller also checks the integrity 225 of the assembled data for occasional missing frames or incomplete frames in the shot. If missing frames or incomplete frames are discovered, the Intelligent Controller sends a request to the same render clients for re-rendering of those frames. The communication between the Intelligent Controller and render clients is crucial for render efficiency. The Intelligent Controller tracks the current state of each render client and constantly monitors for available processors. In the eventuality of failure of a render client, the Intelligent Controller raises an alert for repair. It reroutes the job to other available clients for processing. A Diagnostics process ensures that there is no loss of data during the transfer. If the Intelligent Controller server experiences a failure, the state of the system before malfunction is preserved. In one embodiment of the present invention, the Intelligent Controller server re-starts by killing all processes that are running on render clients and re-assigns jobs to each render client. In another embodiment of the present invention, the Intelligent Controller polls the render clients for their status, finds their current states and resumes the control. This is a more complicated re-start scheme, but no re-rendering of data is required.

As described in earlier sections, the performance of the render operations is evaluated by evaluating statistical quality indicators, like PMR and ASR, calculated by the render clients. However, a normal PMR or ASR measure does not guarantee the optimal visual quality. Human visual inspection is needed to ensure final visual quality, and this process is implemented in the Verification module 113, as depicted in FIG. 11. A proxy version of the enhanced image data, which was generated in the proxy generation process 328 in the render client pipeline (FIG. 7) is used for visual inspection. The size of the proxy images should be adequate for users to spot existing render problems while small enough to ensure software viewing efficiency. By viewing the proxy version displayed in real-time with special purpose software, users are able to make decisions on image quality.

In one embodiment of the present invention, users first check if each job is complete 240. The automated integrity check process 225 at the Render module does not capture all render problems, and those frames missed by the integrity check 225 will be caught at this stage. Those frames found with problems are re-submitted to the original render client for processing. Once a job is deemed complete, users will check the following quality aspects that are of the most concern for users:

verify if the noise level of overall image and in local regions are acceptable 244;
verify if visual sharpness are appropriate 245;
verify if sufficient image details are preserved and enhanced 246;
verify if the re-framing decisions are correct 247;
verify if further color correction is needed 248;
verify if there exist artifacts that need to be removed 249;
verify if the motion exists in the shot may cause viewing discomfort 250.

The inspection of image details requires users to view images at its full resolution. In that case, both the enhanced image data and Original reference are available to users. In one embodiment of the present invention, special purpose software displays both image data within the same viewing window so that users can compare two images using digital wipe function.

If users find that the noise level of a job is too high, or visual sharpness of the job is not appropriate, or there is unacceptable loss of image details, the job will be re-submitted to the Render module with modified render parameters 251. In one embodiment of the present invention, the decision is made by users consulting with measured statistical quality indicators. The Intelligent Controller 141 provides users with a graphical display of those statistical measures (PMR, ASR, TSNR, Motion, etc.) on their workstations 153 through special-purpose software. Users make educated decisions about necessary parameter modifications based on the available statistical data. In another embodiment of the present invention, an automated algorithm is implemented in the process 251 to compute the necessary modifications to render parameters based on the same set of statistical measures.

If users find problems with re-framing, the image shot will be sent back to the Pre-processing module to obtain new re-framing decisions. For problems concerning color 248, artifacts 249 and motion correction 250, users make correction decisions 252 and send the image data to Post-processing for fixing without a pass stamp 253. Every image shot with acceptable image quality gets a pass stamp 254 from the Intelligent Controller and is also sent to the next Post-processing module for data output.

As shown in FIG. 12, at the Post-processing module, image shots that require fixing are sent for artifact removal 265, or for color correction 266, or for motion correction 267. The methods for artifact removal and color correction are very similar to processes at the Pre-processing module 111. The fixed shots are sent back to verification 113 to get pass stamps 254. Any image shot without a pass stamp is not allowed to pass checking point 260. The approved image shots are organized in the same order 261 as in the motion picture and converted to the required output format before being sent to the Image Out stage 120. All these operations at the Post-processing stages are controlled and tracked by the Intelligent Controller 141.

Motion correction 267 is a process specific to large format projection requirement. When a conventional motion picture is exhibited in a large format cinema where images cover a much larger portion of an audience's field of view, the sensation of motion in the motion picture is also magnified. For scenes that contain fast camera motion or rigorous object motion, the magnified motion sensation may cause viewing discomfort for some audiences. Motion correction is a method to reduce motion-related viewing discomfort by reducing angular movement.

In one embodiment of the present invention, the motion correction method is to reduce two types of motion problems: motion strobing and extreme camera shaking. Motion strobing is the perceived motion discontinuity caused by a fixed projection frame rate. The method of reducing motion strobing is to add motion blur to images without increasing the projection frame rate. Motion blur can be generated by applying a directional low-pass filter in the direction of motion for moving pixels. The direction of motion can be retrieved from motion estimates already calculated in the temporal filtering process 322.

Extreme camera shaking can be reduced by partial camera stabilization. The motion of the camera can be calculated by tracking multiple feature points located in the image background. Starting from a large number of features, several thousands for example, the tracking algorithm eliminates most of those features until only the most reliable features are left. Then the process repeats in subsequent frames until the end of the shot. In this way, the most common features are found throughout the entire sequence. For each feature, a motion vector between adjacent frames may be defined. A statistical clustering method is used to group features into regular moving features and irregular moving features. The global camera motion curve is then calculated by averaging all regular moving features. Camera stabilization is achieved by reducing the global motion curve and calculating the entire scene based on tracked features. The amount of motion reduction is the result of the tradeoff between reducing viewing discomfort and maintaining the same motion sensation that filmmakers originally intended.

One important aspect of the present invention is that the Intelligent Controller 141 provides a function of production management, which is extremely important for the success of a motion picture re-mastering project. Since every device and process that accesses data from the Intelligent Controller 141 is treated as a client, the client-server configuration allows the Intelligent Controller to manage the progress of the entire re-mastering project and to track the status of every operation in every stage of the process.

In one embodiment of the present invention, the types of information that are tracked by the Intelligent Controller 141 are listed in FIG. 13. Examples of production data that are tracked include:

Status of Original Image Data;
A scene/shot list and future modifications;
Pre-processing decisions for each shot;
Status of every shot in the different stages of the process;
Operations applied to each shot in every stage of the process;
Parameters used for render operations for each shot;
Version status of each shot;
Verification decisions of each shot;
Status of image out process for each shot;
User preference and user decisions related to each shot;
User notes related to the processing of each shot; and
Approval decisions for each shot, etc.

Based on the above information, the Intelligent Controller provides up-to-date reports regarding the status of the production. The formats of the reports are specified by users. Examples of the reports include:

Percentage of film scanned and received;
How many shots have been processed;
Project completion date estimation based on current throughput;
Percentage of shots have been approved;
List of shots that were rendered with a particular set of parameters;
How many versions are there for each shot;
Daily, weekly, monthly throughput report; and
System utilization report, etc.

The Intelligent Controller also allows users to construct their own reports through a query system. Examples of the information that the query system supports include:

Shot numbers;
Shot length;
Shot versions;
Render parameters;
Verification status; and
Approval status, etc.

The foregoing is provided for purposes of illustrating, explaining, and describing embodiments of the present invention. Further modifications and adaptations to these embodiments will be apparent to those skilled in the art and may be made without departing from the scope or spirit of the invention.

What is claimed is:

1. A method for digitally enhancing image resolution and quality of image sequence data, comprising:

performing a pre-processing process comprising converting the image sequence to a digital format to produce converted image data that comprises original image data;

processing the converted image data to produce enhanced image data, wherein processing the converted image data comprises a render process comprising:

receiving converted image data separated into shots having image shot data, wherein each shot is a render job;

estimating initial motion estimation settings using at least part of the converted image data;

determining statistical measures based at least in part on the initial motion estimation settings, the statistical measures being associated with temporal characteristics of the converted image data;

predicting a render parameter set for each render job based at least in part on the statistical measures, the render parameter set comprising render parameters;

distributing render jobs among multiple computing render clients for processing the render jobs;

performing temporal image processing on the render jobs using the render parameters to produce render results;

assembling the render results into a continuous shot;

checking an integrity of the assembled render results to identify missing frames or incomplete frames and repairing the assembled render results by re-rendering the missing frames or the incomplete frames;

computing quality indicators based on the assembled render results;

evaluating processing render quality based on the quality indicators of the assembled render results;

modifying the render parameters to improve the render results and re-processing as determined by evaluation; and determining the assembled render results are the enhanced image data if the quality indicators are within normal ranges;

performing a verification process and a post-processing process on the enhanced image data; and outputting the enhanced image data.

2. The method of claim 1 further comprising converting the enhanced image data to an alternative format.

3. The method of claim 2 wherein the alternative format is a film format with enhanced resolution and quality, and wherein converting the enhanced image data to an alternative format comprises film recording using a film recorder.

4. The method of claim 2 wherein the alternative format is a digital display format with enhanced resolution and quality, and wherein converting the enhanced image data to an alternative format comprises data conversion to digital display format.

5. The method of claim 2 wherein the alternative format is a concurrent release of an original motion picture with enhanced resolution and quality.

6. The method of claim 1 further comprising receiving approval of the output of enhanced image data.

7. The method of claim 1 wherein the image sequence is a motion picture originated in a 35 mm film format, and wherein converting the image sequence to a digital format comprises digitizing the film using a film scanner.

8. The method of claim 1 wherein the image sequence is a motion picture originated in a digital format, and wherein converting the image sequence to a digital format comprises data conversion from the original digital format.

9. The method of claim 1 wherein the image sequence is in any image sequence format containing images captured using a device with an optical or electronic sensor.

10. The method of claim 1 wherein the pre-processing process comprises:

receiving at least one pre-processing decision from a user based on previewing the converted image data and previewing a proxy version of the converted image data, the at least one pre-processing decision relating to at least one of:
shot separation;
re-framing;
artifact identification;
scene classification;
cropping;
color correction;
image resizing; and
artifact removal; and using image processing tools based on the at least one pre-processing decision to prepare the original image data for the render process.

11. The method of claim 10 wherein the scene classification is performed by an automated algorithm based on scene analysis.

12. The method of claim 10 wherein the artifact identification and artifact removal is performed by an automated algorithm in which artifacts are identified by their unique characteristics both from a current frame and from neighboring frames and removed by predicted pixel values calculated based on inter-frame motion estimates or intra-frame interpolation.

13. The method of claim 10 wherein the artifact identification and artifact removal is performed by a semi-automated algorithm for interactively locating artifacts and automated removal using temporal processing.

14. The method of claim 1 wherein predicting the render parameter set for a shot comprises:

locating key frames;

computing motion estimates by using the initial motion estimation settings and applying motion estimation algorithms to the key frames;

determining the statistical measures based at least in part on the initial motion estimation settings to generate the render parameter set; and determining render parameters using the statistical measures and user preferences.

15. The method of claim 14 wherein the statistical measures comprises:

temporal signal-to-noise ratio;
Motion; and
fast matching distribution.

16. The method of claim 14, wherein estimating initial motion estimation settings comprises:

estimation of granularity of the image noise distribution;
estimation of matching region of support based on the estimated noise granularity;
estimation of global motion by calculating the average absolute motion between key frames; and
estimation of searching range based on estimated global motion.

17. The method of claim 1, wherein performing temporal image processing on the render jobs using the render parameters to produce render results comprises:

one or more temporal filtering schemes further comprising at least one of:
using a multi-pass temporal filtering method;
a temporal pyramid filtering method;

a serial temporal filtering method; or
a single pass temporal filtering method;
image resizing; and
image sharpening based on modulation transfer function compensation.

18. The method of claim 17 wherein the temporal filtering schemes comprises:
computing motion estimates;
regulating motion fields; and
recovering details.

19. The method of claim 17 wherein the modulation transfer function compensation is based on selective enhancement of multiple levels of image details.

20. The method of claim 17, wherein processing of each of the distributed render jobs further comprises at least one of:
lighting change compensation and lighting change inverse transform;
noise equalization and inverse noise equalization; or
proxy generation.

21. The method of claim 1 wherein the quality indicators comprise pixel matching ratio and absolute still ratio.

22. The method of claim 21, further comprising evaluating the performance of the temporal filtering is based on the quality indicators.

23. The method of claim 1 wherein evaluating processing render quality is based on pixel matching ratio and absolute still ratio.

24. The method of claim 1 wherein the render parameters are modified based on pixel matching ratio and absolute still ratio.

25. The method of claim 1 wherein distributing render jobs among multiple computing render clients is performed based on a load-balancing scheme by at least one of:
assigning an entire image shot to a single render client;
dividing an image shot into overlapping segments and distributing them to render clients; and
dividing an image frame into overlapping regions and distributing them to render clients.

26. The method of claim 1 wherein the verification process comprises:
receiving a pass stamp if a render image shot meets quality standards after:
visually checking a proxy version of the enhanced image data for completeness;
visually verifying image noise level, sharpness and detail preservation and modifying render parameters for re-submission if necessary based on statistical measures; and
visually verifying color, artifacts and motion comfort level.

27. The method of claim 1 wherein the post-processing process comprises at least one of:
final artifact removal;
final color correction;
motion correction;
organizing images; and
output image data conversion.

28. The method of claim 27 wherein motion correction comprises reducing motion strobing by adding motion blur and reducing extreme camera shaking by partial camera stabilization.

29. The method of claim 1, wherein temporal image processing comprises:
recovering image details from multiple image frames using a temporal filtering method with render parameter prediction;
evaluating the performance of the temporal filtering and modifying render parameters using quality indicators; and
sharpening image details by emphasizing a selected range of detail levels.

30. The method of claim 29, wherein the temporal filtering method further comprises at least one of:
a multi-pass temporal filtering method;
a temporal pyramid filtering method;
a serial temporal filtering method; and
a single pass temporal filtering method.

31. The method of claim 29, wherein the temporal filtering method further comprises:
a noise equalization method; and
a lighting change compensation method.

32. The method of claim 29, wherein sharpening image details comprises:
using varying kernel sizes to selectively emphasize image details at different detail levels; and
using a selective sharpening gain value at each detail level to compensate modulation transfer function degradation.

33. The method of claim 32, wherein using the selective sharpening gain value at each detail level to compensate modulation transfer function degradation comprises selectively enhancing multiple levels of image details.

34. The method of claim 29, wherein sharpening image details by emphasizing a selected range of detail levels comprises:
applying a first level of sharpening to a first level of detail of the converted image data; and
applying a second level of sharpening to a second level of detail of the converted image data.

35. The method of claim 34, wherein applying the first level of sharpening to the first level of detail of the converted image data comprises:
using a first kernel size to emphasize image details at the first level of detail; and
using a first sharpening gain value at the first level of detail to compensate modulation transfer function degradation,
wherein applying the second level of sharpening to the second level of detail of the converted image data comprises:
using a second kernel size to emphasize image details at the second level of detail; and
using a second sharpening gain value at the second level of detail to compensate modulation transfer function degradation.

36. The method of claim 34, wherein applying the first level of sharpening to the first level of detail of the converted image data and applying the second level of sharpening to the second level of detail of the converted image data is based, at least in part, on modulation transfer function compensation.

37. The method of claim 1, further comprising:
repeating the processing of converted image data if the quality indicators are not within the normal ranges.

38. The method of claim 1, wherein the enhanced image data comprises a number of pixels greater than the converted image data that comprises original image data.

39. The method of claim 1, wherein converting the image sequence, processing the converted image data, and outputting the enhanced image data are automatically controlled and allow user input and interaction.

40. The method of claim 1, wherein determining the assembled render results are the enhanced image data if the quality indicators are within the normal ranges comprises:

comparing the quality indicators to a standard profile comprising the normal ranges for the quality indicators.

41. A system for enhancing a resolution and quality of an image sequence, comprising:

an intelligent controller that automatically controls, monitors, and manages digitally enhancing the resolution and quality of an image sequence, the intelligent controller comprising:
- a central control computer server; and
- a controller data storage device for supporting the central control computer server;

a plurality of computing render devices for processing original image data to produce enhanced image data having enhanced resolution and quality, each render device of the render devices being automatically controlled and adapted to receive user input and interaction and configured as client devices to the central control server, wherein the multiple computing render devices are configured to produce enhanced image data by:
- performing a pre-processing process by converting the image sequence to a digital format to produce converted image data that comprises original image data;
- performing a render process by:
  - receiving converted image data separated into shots having image shot data, wherein each shot is a render job;
  - estimating initial motion estimation settings using at least part of the converted image data;
  - determining statistical measures based at least in part on the initial motion estimation settings, the statistical measures being associated with temporal characteristics of the converted image data;
  - predicting a render parameter set for each render job based at least in part on the statistical measures, the render parameter set comprising render parameters;
  - distributing render jobs among the plurality of computing render devices for processing the render jobs;
  - performing temporal image processing on the render jobs using the render parameters to produce render results;
  - assembling the render results into a continuous shot;
  - checking an integrity of the assembled render results to identify missing frames or incomplete frames and repairing the assembled render results by re-rendering the missing frames or the incomplete frames;
  - computing quality indicators based on the assembled render results;
  - evaluating processing render quality based on the quality indicators of the assembled render results;
  - modifying the render parameters to improve the render results and re-processing as determined by evaluation; and
  - determining the assembled render results are the enhanced image data if the quality indicators are within normal ranges; and
- performing a verification process and a post-processing process on the enhanced image data.

42. The system of claim 41 where the computing render devices are standard computers configured in a parallel and distributed configuration designed for supporting temporal processing of multiple image sequences simultaneously.

43. The system of claim 41 wherein the central control computer server is capable of resource management; quality optimization; computing efficiency optimization; production management; system administration; and user interactivity.

44. The system of claim 41, further comprising:
- a data file server configured as a client device of the central control server;
- multiple workstations for user input and interactive operations relating to the processing of the original image data and configured as client devices to the central control server;
- a central data storage device for storing image data and process data;
- image data input and output devices; and
- a computer network that provides communications between the central control server and all client devices.

45. The system of claim 44, further comprising a central data storage comprising the controller data storage device and the central data storage device; and
wherein the central control server comprises the data file server.

46. The system of claim 41, wherein the enhanced image data comprises a number of pixels greater than the converted image data that comprises original image data.

47. The system of claim 41, wherein the multiple computing render devices are capable of determining the assembled render results are the enhanced image data if the quality indicators are within the normal ranges by:
comparing the quality indicators to a standard profile comprising the normal ranges for the quality indicators.

* * * * *